(12) United States Patent
Tse et al.

(10) Patent No.: US 7,812,085 B2
(45) Date of Patent: *Oct. 12, 2010

(54) FUNCTIONALIZED PROPYLENE COPOLYMER ADHESIVE COMPOSITION

(75) Inventors: Mun-Fu Tse, Seabrook, TX (US); Jean-Roch Schauder, Wavre (BE); Feng Li, Katy, TX (US); Thottinal Abraham Mathew, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 1056 days.

This patent is subject to a terminal disclaimer.

(21) Appl. No.: 11/440,303

(22) Filed: May 24, 2006

(65) Prior Publication Data

US 2006/0293424 A1 Dec. 28, 2006

Related U.S. Application Data

(60) Provisional application No. 60/693,739, filed on Jun. 24, 2005.

(51) Int. Cl.
*C08K 5/00* (2006.01)
(52) U.S. Cl. ...................... 524/515; 524/528
(58) Field of Classification Search ................ 524/515, 524/528
See application file for complete search history.

(56) References Cited

U.S. PATENT DOCUMENTS

| | | | |
|---|---|---|---|
| 4,822,688 A | 4/1989 | Nogues | 428/458 |
| 5,350,817 A | 9/1994 | Winter et al. | 526/119 |
| 5,476,914 A | 12/1995 | Ewen et al. | 526/351 |
| 5,696,045 A | 12/1997 | Winter et al. | 502/113 |
| 5,976,652 A | 11/1999 | Krause et al. | 428/35.9 |
| 5,998,547 A | 12/1999 | Hohner | 525/301 |
| 6,114,457 A | 9/2000 | Markel et al. | 525/240 |
| 6,143,846 A | 11/2000 | Herrmann et al. | 526/170 |
| 6,147,180 A | 11/2000 | Markel et al. | 526/352 |
| 6,184,326 B1 | 2/2001 | Razavi et al. | 526/351 |
| 6,184,327 B1 | 2/2001 | Weng et al. | 526/351 |
| 6,207,606 B1 | 3/2001 | Lue et al. | 502/113 |
| 6,225,432 B1 | 5/2001 | Weng et al. | 526/351 |
| 6,245,870 B1 | 6/2001 | Razavi | 526/127 |
| 6,258,903 B1 | 7/2001 | Mawson et al. | 526/113 |
| 6,271,323 B1 | 8/2001 | Loveday et al. | 526/161 |
| 6,297,301 B1 | 10/2001 | Erderly et al. | 524/157 |
| 6,310,134 B1 | 10/2001 | Templeton et al. | 524/531 |
| 6,340,730 B1 | 1/2002 | Murray | 526/114 |
| 6,342,574 B1 | 1/2002 | Weng et al. | 526/351 |
| 6,627,723 B2 | 9/2003 | Karandinos et al. | 526/348 |
| 6,656,385 B2 | 12/2003 | Lynch et al. | 252/299.61 |
| 6,659,965 B1 | 12/2003 | Kensey et al. | 600/573 |
| 6,747,114 B2 | 6/2004 | Karandinos et al. | 526/348.2 |
| 7,015,283 B2 | 3/2006 | Schauder et al. | 525/66 |
| 7,550,528 B2 * | 6/2009 | Abhari et al. | 524/487 |
| 2001/0007896 A1 | 7/2001 | Agarwal et al. | 526/335 |
| 2002/0010257 A1 | 1/2002 | Templeton et al. | 524/531 |
| 2004/0053067 A1 | 3/2004 | Dharmarajan et al. | 428/521 |
| 2004/0127614 A1 | 7/2004 | Jiang et al. | 524/270 |
| 2004/0138392 A1 | 7/2004 | Jiang et al. | 526/114 |

FOREIGN PATENT DOCUMENTS

| | | |
|---|---|---|
| EP | 1 366 087 | 12/2003 |
| JP | 01-152448 | 6/1989 |
| JP | 2824082 | 2/1990 |
| WO | WO 98/32784 | 7/1998 |
| WO | WO 98/49229 | 11/1998 |
| WO | WO 00/37514 | 6/2000 |
| WO | WO 01/09200 | 2/2001 |
| WO | WO 01/81493 | 11/2001 |
| WO | WO 02/36651 | 5/2002 |
| WO | WO 03/040095 | 5/2003 |
| WO | WO 03/040201 | 5/2003 |
| WO | WO 03/040202 | 5/2003 |
| WO | WO 03/040233 | 5/2003 |
| WO | WO 03/040442 | 5/2003 |
| WO | WO 2004/014998 | 2/2004 |

* cited by examiner

*Primary Examiner*—Peter D Mulcahy

(57) ABSTRACT

This invention relates to an adhesive composition comprising a functionalized random propylene polymer (FRPP) having at least 0.1 wt % of a functional group, a heat of fusion of between 0.5 and 70 J/g, and an mm triad tacticity index of at least 75%, where the adhesive has a T-Peel adhesion on a polar substrate at 20° C. of at least 175 N/m (1 lb/in) and a T-Peel adhesion on a non-polar substrate at 20° C. of at least 175 N/m (1 lb/in) where the polarity of the polar substrate is at least 0.10 units higher than the polarity of the non-polar substrate. Methods to produce the adhesive and articles comprising the adhesive are also disclosed.

23 Claims, No Drawings

FUNCTIONALIZED PROPYLENE COPOLYMER ADHESIVE COMPOSITION

CROSS REFERENCE TO RELATED APPLICATION

This application claims the benefit of Provisional Application No. 60/693,739 filed Jun. 24, 2005, the disclosure of which is incorporated by reference.

FIELD OF THE INVENTION

This invention relates to a polymer, to a polymer composition, to an adhesive, an adhesive composition, an adhesion additive, an article comprising an adhesive, and a process of making the same. The polymer comprises a functionalized propylene polymer. In particular, the polymer comprises functionalized random propylene polymer in combination with one or more additives.

BACKGROUND OF THE INVENTION

Olefin based polymers (polyolefins) are widely used in various applications due to their being chemically inert, having low density, and low cost. Applications include those related to adhesives, tie layers, skin layers, films, fibers, articles, laminates, overmolded parts, co-injected parts, and combinations thereof.

Polyolefin adhesives may be formed into various films, which may be laminated to, coated on, or co-extruded with various substrates. The film and the substrate may be combined with other materials to form a structure having a plurality of layers, each layer having a specific purpose. Packaging laminates, for example, may comprise a plurality of layers, such as a configurationally rigid core layer of paper or paperboard, an outer liquid-tight layer, an oxygen gas barrier such as a mid-layer of aluminum foil, and/or other layers depending on application needs.

To provide effective adhesion, it may be preferable that good bonding strength or intimate integrity between the layers be achieved for most applications. However, relatively non-polar olefin based polymers do not normally adhere well to substrates which are more polar than they.

Thus, there remains a need for an adhesive that will intimately bond to both polar and non-polar substrates, preferably one that exhibits a superior durability of bond strength under various temperature conditions and in the presence of aggressive products.

In addition, to function as a tie layer or other adhesive, an adhesive composition may need to demonstrate adhesion between various polar and non-polar substrates.

For example, U.S. Pat. No. 6,656,385 to Wang et al. (Wang) is directed to a hot melt adhesive comprising about 15 to about 70% syndiotactic polypropylene and amorphous poly(alpha-olefin) along with a tackifier, optionally a plasticizer and/or a stabilizer. Wang defines syndiotactic polypropylene to have greater than 70% r dyads. As such, Wang does not disclose a functionalized propylene copolymer adhesive composition.

U.S. Pat. No. 4,822,688 to Nogues is directed to an adhesive composition comprising polypropylene modified by grafting with an acid anhydride which is further reacted with a compound bearing at least two groups such as a polyol or a polyamine. While Nogues discloses functionalized polyolefins, the reference does not disclose functionalized propylene copolymer adhesive promoters that improve adhesion.

Numerous references are directed to compositions comprising syndiotactic polypropylene as an adhesion promoter. Examples include Japanese Patent Application 01-152448, Japanese Patent no. JP2824082, U.S. Pat. Nos. 5,476,914, 6,184,326, and 6,245,870 all assigned to Fina Technology Inc. which are directed to vanadium catalysts capable of producing compositions comprising syndiotactic polypropylene having greater than 80% r dyads. However, they do not disclose a functionalized propylene copolymer adhesive composition.

U.S. Pat. No. 7,015,283 discloses thermoplastic compositions of polypropylene for use in molded articles. The reference discloses maleated polypropylene copolymers having 0.25 wt % maleic anhydride, but is silent with regard to adhesion or adhesive properties.

WO 02/036651 discloses various maleated propylene based polymers and states at page 26 that such polymers may be useful as adhesion promoters between a polypropylene matrix and glass fibers or compatibilizers in polyamide/polypropylene blends or to increase the elongation at break of glass filled polyamide/polypropylene blends.

U.S. Pat. No. 6,310,134 (and related divisional US 2002/0010257) discloses a solvent based primer that is apparently a combination of lower molecular weight modified polyolefin with a selected solvent. The disclosure also does not specify the triad tacticity.

EP 1 366 087 discloses a non-chlorinated adhesion promoter in which a modified polymer is used with selected solvent as a primer. Example 2 uses an unmodified polymer comprising 80 mol % propylene derived units with a heat of fusion of approximately 5.2 calories per gram but there is no indication of the triad tacticity level.

U.S. Pat. No. 6,627,723 discloses adhesives comprising propylene based polymers where the polymer has, among other things, a heat of fusion of from about 30 to about 80 J/g.

U.S. Pat. No. 6,747,114 discloses adhesives comprising propylene based polymers where the polymer has, among other things, a specific storage modulus (G') in combination with a specific diad distribution of less than 1.07.

Accordingly, there remains a need for a polymer composition comprising a functionalized propylene copolymer which demonstrates a benefit in adhesive properties to both polar and non-polar substrates.

Additional references of interest include: U.S. Pat. No. 6,207,606, U.S. Pat. No. 6,258,903, U.S. Pat. No. 6,271,323, U.S. Pat. No. 6,340,703, U.S. Pat. No. 6,297,301, U.S. Pat. No. 6,184,327, U.S. Pat. No. 6,225,432, U.S. Pat. No. 6,342,574, U.S. Pat. No. 6,147,180, U.S. Pat. No. 6,114,457, U.S. Pat. No. 6,143,846, U.S. Pat. No. 5,998,547, U.S. Pat. No. 5,696,045, U.S. Pat. No. 5,350,817, and U.S. Pat. No. 6,659,965, US 2001/0007896 A1, WO 00/37514, WO 01/81493, WO 98/49229, WO 98/32784, WO 2004/014998, WO 2003/040095, WO 2003/040201, WO 2003/040202, WO 2003/040233, WO 2003/040442, and WO 01/09200.

SUMMARY OF THE INVENTION

This invention relates to an adhesive comprising functionalized random propylene polymer (FRPP), the FRPP having:
at least 0.1 wt % of a functional group;
a heat of fusion of between 0.5 and 70 J/g; and
an mm triad tacticity index of at least 75%,
wherein the adhesive has a T-Peel adhesion on a polar substrate at 20° C. of at least 175 N/m (1 lb/in) and a T-Peel adhesion on a non-polar substrate at 20° C. of at least 175 N/m (1 lb/in), and where the polarity of the polar substrate is at least 0.10 units higher than the polarity of the non-polar substrate.

This invention also relates to a process to make an adhesive comprising the steps of mixing a FRPP comprising:
- at least 0.1 wt % of a functional group;
- a heat of fusion of between 0.5 and 70 J/g; and
- an mm triad tacticity index of at least 75%, with one or more additives, preferably selected from the group consisting of: an amorphous propylene polymer grafted to isotactic propylene polymer, a $C_2$-$C_{40}$ polymer, an elastomer, an impact copolymer, a tackifier, a crosslinking agent, an antioxidant, a neutralizing agent, a nucleating agent, a filler, an oil, a plasticizer, a wax, an ester polymer, and a combination comprising one or more of the foregoing additives to produce the adhesive, wherein the adhesive has a T-Peel adhesion on a polar substrate at 20° C. of at least 175 N/m (1 lb/in) and a T-Peel adhesion on a non-polar substrate at 20° C. of at least 175 N/m (1 lb/in), where the polarity of the polar substrate is at least 0.10 units higher than the polarity of the non-polar substrate.

DETAILED DESCRIPTION

Definitions

For the purposes of this invention and the claims thereto and for ease of reference when a polymer is referred to as comprising an olefin, the olefin present in the polymer is the polymerized form of the olefin. For ease of reference polypropylene is abbreviated PP, isotactic polypropylene is abbreviated iPP, and syndiotactic polypropylene is abbreviated sPP.

For purposes of this invention and the claims thereto, the term oligomer refers to compositions having 2-40 mer units and the term polymer refers to compositions having 41 or more mer units. A mer is defined as a unit of an oligomer or polymer that originally corresponded to the monomer(s) used in the oligomerization or polymerization reaction. For example, the "mer" of polyethylene would be ethylene. For simplicity, when polymers are referred to, the reference may also apply to oligomers, unless specifically specified otherwise. Accordingly, the term polymer and oligomer may be referred to interchangeably herein unless otherwise specified. In addition, unless otherwise stated, the term "polymer" may include both homopolymers (i.e., a polymer comprising essentially one monomer), and/or a copolymer (i.e., a polymer comprising more than one monomer).

For purposes of this invention and the claims thereto, the term copolymers means any polymer comprising two or more monomers.

Furthermore, when catalyst components are described as comprising neutral stable forms of the components, it is well understood by one of ordinary skill in the art, that the active form of the component is the form that reacts with the monomers to produce polymers.

The new notation numbering scheme for the Periodic Table Groups is used herein as set out in CHEMICAL AND ENGINEERING NEWS, 63(5), 27 (1985).

As used herein, the term "polypropylene", "propylene polymer," or "PP" refers to homopolymers, copolymers, terpolymers, and interpolymers, comprising from 50 to 100 wt % of propylene.

Melting point (Tm), peak crystallization temperature (Tc), heat of fusion (Hf) and percent crystallinity are determined using the following procedure according to ASTM E 794-85. Differential scanning calorimetric (DSC) data is obtained using a TA Instruments model 2910 machine or a Perkin-Elmer DSC 7 machine. In the event that the TA Instruments 2910 machine and the Perkin-Elmer DSC-7 machine produce different DSC data, the data from the TA Instruments model 2910 shall be used. Samples weighing approximately 5-10 mg are sealed in aluminum sample pans. The DSC data is recorded by first cooling the sample to −50° C. and then gradually heating it to 200° C. at a rate of 10° C./minute. The sample is kept at 200° C. for 5 minutes before a second cooling-heating cycle is applied. Both the first and second cycle thermal events are recorded. Areas under the melting curves are measured and used to determine the heat of fusion and the degree of crystallinity. The percent crystallinity (X %) is calculated using the formula, X %=[area under the curve (Joules/gram)/B (Joules/gram)]*100, where B is the heat of fusion for the homopolymer of the major monomer component. These values for B are to be obtained from the Polymer Handbook, Fourth Edition, published by John Wiley and Sons, New York 1999. A value of 189 J/g (B) is used as the heat of fusion for 100% crystalline polypropylene. A value of 290 J/g (B) is used as the heat of fusion for 100% crystalline polyethylene. For the semi-crystalline polymers, having appreciable crystallinity, the melting temperature is measured and reported during the second heating cycle (or second melt). For the semi-amorphous polymers, having comparatively low levels of crystallinity, the melting temperature is measured and reported during the first heating cycle. Prior to the DSC measurement, the sample is aged (typically by holding it at ambient temperature for a period up to about 5 days) or annealed to maximize the level of crystallinity.

As used herein, the term "nonwoven" or "nonwoven fabric" refers to any material made from the aggregation of fibers fabricated by methods such as, for example, spunbonding, melt blowing, thermobonding, or combinations thereof.

A non-polar substrate is any substrate having a polarity as determined by the method described below of less than 0.10. Examples of non-polar substrates may include olefin polymers such as polyethylene, polypropylene, polydimethylsiloxane, poly(2-ethylhexyl acrylate), and/or the like. A polar substrate is any substrate having a polarity, as determined by the method described below, of 0.10 or more. Examples of polar substrates may include polyester, polyamide and/or metal substrates such as aluminum. The exemplary substrates listed herein with which the present invention may be used are offered merely as examples, and are not intended to be limiting to the present invention unless specifically noted otherwise. In preferred embodiments, the polarity of the polar substrate is at least 0.15 units higher than the polarity of the non-polar substrate (preferably at least 0.20, 0.25, 0.30, 0.35, 0.40, 0.45, 0.50, 0.55, 0.60, 0.65, 0.70, 0.75, 0.80, 0.85, 0.90, or 0.95 units higher), as measured according to the method described below. In another preferred embodiment the polarity of the polar substrate is 0.20 to 1.0, preferably 0.25 to 1.0, preferably 0.3 to 0.99, preferably 0.35 to 0.95, preferably 0.40 to 0.95, preferably 0.45 to 0.95, preferably 0.50 to 0.95, preferably 0.60 to 0.95 preferably 0.65 to 0.95, preferably 0.70 to 0.95, preferably 0.75 to 0.95, preferably 0.80 to 0.95, preferably 0.85 to 0.95, preferably 0.90 to 0.95.

Substrate Polarity

For purposes herein, a polar substrate is defined to be a substrate having a polarity (xP) of 0.10 or greater. A nonpolar substrate is defined as a substrate having a polarity of less than 0.10. The polarity of a substrate, abbreviated herein as "$x_sP$", is defined as:

$$x_sP = \gamma_s^P / \gamma_s$$

wherein $\gamma_s$ is the surface tension of the substrate, defined by the equation $$\gamma_s = \gamma_s^d + \gamma_s^P$$

where $\gamma_s^d$ is the dispersion component arising from dispersion-force interactions and $\gamma_s^p$ the polar component arising from dipolar and specific interactions.

The values of $\gamma_s^d$ and $\gamma_s^p$ of a given substrate "s" are determined using the harmonic-mean method described below using the contact angle of two probing liquids on the substrate.

Contact Angle Measurements

The contact angle of two probing liquids is used to determine the values of $\gamma^d$ and $\gamma^p$ for a given polymer or other substrate. The first probing liquid is methylene iodide, the second probing liquid is de-ionized water, and the contact angle drop size is 7 µL. Importantly, these probing liquids (i.e., water and methylene iodide) are non-solvents for the substrate studied, otherwise the results would be erroneous. Unless otherwise specified, polymeric substrate samples are prepared by compression-molding the polymer into a 1 inch by 1 inch by ⅛ inch plaque. Metallic substrates (e.g., aluminum) are rinsed with a solvent such as acetone to clean them prior to testing. The substrate sample is then allowed to reach 20° C. and then placed on a horizontal surface, liquid drops of the probing liquids are then placed on the surface of the sample and the contact angles determined with a Goniometer, where the Gonimeter has been standardized to yield a consistent value for deionized water on a polyethylene plaque. The contact angles are measured at 20° C.

Harmonic-Mean Method

This method uses the contact angles of the two probing liquids as determined above, with the harmonic-mean equation $$(1+\cos\theta_1)\gamma_1 = 4\left(\frac{\gamma_1^d \gamma_s^d}{\gamma_1^d+\gamma_s^d} + \frac{\gamma_1^p \gamma_s^p}{\gamma_1^p+\gamma_s^p}\right)$$

$$(1+\cos\theta_2)\gamma_2 = 4\left(\frac{\gamma_2^d \gamma_s^d}{\gamma_2^d+\gamma_s^d} + \frac{\gamma_2^p \gamma_s^p}{\gamma_2^p+\gamma_s^p}\right)$$

wherein:

$\theta_1$ is the contact angle of the water on the substrate sample as measured at 20° C. above;

$\gamma_1$ is the known surface tension for water at 20° C. (72.8 dyne/cm);

$\gamma_1^d$ is the known dispersion component for water at 20° C. (50.7 dyne/cm);

$\gamma_1^p$ is the known polar component for water at 20° C. (22.1 dyne/cm);

$\theta_2$ is the contact angle of the methylene iodide on the substrate sample as measure at 20° C. above;

$\gamma_2$ is the known surface tension for methylene iodide at 20° C. (50.8 dyne/cm);

$\gamma_2^d$ is the known dispersion component for the methylene iodide at 20° C. (6.7 dyne/cm);

$\gamma_2^p$ is the known polar component for the methylene iodide at 20° C. (44.1 dyne/cm);

$\gamma_s^d$ is the unknown dispersion component for the solid surface substrate sample under investigation; and $\gamma_s^p$ is the unknown polar component for the solid surface substrate sample under investigation.

Accordingly, the dispersion and polar components of solid surface tension ($\gamma_s^d$ and $\gamma_s^p$) are obtained from the contact angles $\theta_1$ and $\theta_2$ by solving the above two simultaneous equations. Water and methylene iodide are the two probing liquids used herein. The known $\gamma^d$ and $\gamma^p$ values for water and methylene iodide are listed in Table 1.

TABLE 1

| Probing Liquid | Surface Tension at 20° C., dyne/cm | | |
|---|---|---|---|
| | $\gamma$ | $\gamma^p$ | $\gamma^d$ |
| Water | 72.8 | 22.1 | 50.7 |
| Methylene Iodide | 50.8 | 44.1 | 6.7 |

For further background on polarity, see Polymer Handbook, 4th Ed., Ed. by J. Brandrup, E. H. Immergut, and E. A. Grulke, John Wiley & Sons, Inc., New York, 1999, VI/521-VI/541; and S. Wu, Polymer Interface and Adhesion, Marcel Dekker, New York, 1982.

Non-polar substrates useful in this invention may include polypropylene, polyethylene, polydimethylsiloxane, poly(2-ethylhexyl acrylate), and the like having a polarity less than 0.10. Polar substrates useful in this invention include copolymers of ethylene and vinyl alcohol (EVOH), polyester (PET, e.g., Mylar®), metallic substrates such as aluminum, glass, nylon, polycarbonate, polyesters, copolymers of ethylene and vinyl acetate (EVA), polyvinyl chloride (PVC), methacrylate polymers, glass beads, wood, paper, and other cellulosic substrates, and the like, all of which have a polarity greater than or equal to 0.10.

Random Propylene Polymer

The propylene polymers useful in the present invention as polymers that can be functionalized to prepare FRPP's include random propylene polymers. Preferred random propylene polymer useful in the present invention can be prepared by polymerizing propylene with one or more of a $C_2$ or $C_4$-$C_{20}$ alpha olefin, most preferably the random propylene polymer comprises propylene and ethylene, (preferably from 3 to 25 wt % ethylene). The monomers are preferably polymerized in the presence of a chiral metallocene catalyst system (i.e., a chiral metallocene pre-catalyst in combination with an activator and optionally a scavenger). The comonomer or comonomers used in combination with propylene may be linear and/or branched. Preferred linear alpha-olefins include ethylene or $C_4$ to $C_8$ alpha-olefins, more preferably ethylene, 1-butene, 1-hexene, and 1-octene, even more preferably ethylene or 1-butene. Preferred branched alpha-olefins include 4-methyl-1-pentene, 3-methyl-1-pentene, and 3,5,5-trimethyl-1-hexene.

Typically, random propylene polymers useful in this invention are obtained by using catalysts that allow control of polymer tacticity. Generally these catalysts are used in combination with comonomers and/or the polymerization temperature to manipulate the level of tacticity. Useful catalysts are typically those that are capable of a level of stereoregular placement, generally by suitable chirality of a single site catalyst. Such catalysts are typically a transition metal complex generally containing a transition metal from Group 3, 4, 5, 6, 7, 8, 9 or 10 of the Periodic Table; and at least one ancillary ligand that remains bonded to the transition metal during polymerization. Preferably the transition metal is used in a reduced cationic state and stabilized by a co-catalyst or activator. The ancillary ligand may be a structure capable of forming a π bond such a cyclopentadienyl type ring structure. The ancillary ligand may also be a pyridinyl or amide ligand. The transition metal is preferably of Group 4 of the Periodic Table such as titanium, hafnium or zirconium which is preferably used in polymerization in the $d^0$ mono-valent cationic state and preferably has one or two ancillary ligands. For coordination polymerizations, such catalysts typically have a ligand capable of abstraction and a ligand into which the ethylene (olefinic) group can be inserted.

The manner of activation of the catalysts can vary. Alumoxane and preferably methyl alumoxane can be used suitably in an amount to provide a molar aluminum to metallocene ratio of from 1:1 to 20,000:1. Non- or weakly coordinating anion activators (NCA's) derived and/or generated in any of the ways described in EP277004, EP426637, may also be sued as activators. The non-coordinating anion can be a Group 10-14 complex wherein boron or aluminum is the charge-bearing atom shielded by ligands, which may be halogenated, and especially perfluorinated. Preferably tetra-aryl-substituted Group 10-14 non-carbon element-based anion, especially those that are have fluorine groups substituted for hydrogen atoms on the aryl groups, or on alkyl substituents on those aryl groups.

An activation step generally forms the catalytically active ion pair from neutral precursors. This reaction may involve abstraction of an anionic group such as the methyl group to form a metallocene cation, although according to some literature zwitterions may be produced. The NCA precursor may be an ion pair of a borate or aluminate in which the precursor cation is eliminated upon activation in some manner, e.g. trityl or ammonium derivatives of tetrakis pentafluorophenyl boron (See EP277004). The NCA precursor can be a neutral compound such as a borane, which is formed into a cation by the abstraction of and incorporation of the anionic group abstracted from the metallocene (See EP426638). A precursor for the non-coordinating anion may be used with a transition metal complex supplied in a reduced valency state. The precursor may undergo a reduction-oxidation reaction. In a preferred embodiment, precursor cation may be a triphenyl carbenium derivative as in EP426637.

The non-coordinating anion may be used in approximately equimolar amounts relative to the transition metal complex, such as at least 0.25, preferably 0.5, and especially 0.8 and such as no more than 4, preferably 2 and especially 1.5.

Pyridine amine complexes, such as those described in WO03/040201 are also useful to produce the random propylene polymers useful herein. The catalyst may a fluxional complex, which undergoes periodic intra-molecular re-arrangement so as to provide the desired interruption of stereoregularity as in U.S. Pat. No. 6,559,262. The catalyst may be a stereorigid complex with mixed influence on propylene insertion, see Rieger EP1070087.

Preferably the catalyst is a chiral metallocene catalyst used with an activator and optional scavenger. Typically, mono-anionic ligands of such metallocenes are displaceable by a suitable activator to permit insertion of a polymerizable monomer or macro-monomer for polymerization on the vacant coordination site of the transition metal component. Such metallocenes are described in 1) U.S. Pat. No. 6,048,950 which discloses bis(indenyl)bis(dimethylsilyl)zirconium dichloride used together with methylalumoxane; 2) WO 98/27154 which discloses a dimethylsilyl bridged bis-indenyl hafnium di-methyl used together with a non-coordinating anion activator; and 3) EP1 070 087 which discloses a bridged biscyclopentadienyl catalyst which has elements of asymmetry between the two cyclopentadienyl ligands to give a polymer with elastic properties. Also useful are the metallocenes described in U.S. Pat. Nos. 6,448,358 and 6,265,212, U.S. Pat. Nos. 5,198,401 and 5,391,629.

Useful other catalysts are metallocenes, such as those described in U.S. Pat. No. 5,026,798, which have a single cyclopentadienyl ring, advantageously substituted and/or forming part of a polycyclic structure, and a hetero-atom, generally a nitrogen atom, but possibly also a phosphorus atom or phenoxy group connected to a Group 4 transition metal, preferably titanium but possibly zirconium or hafnium. A further example is $Me_5CpTiMe_3$ activated with $B(CF)_3$ as used to produce elastomeric polypropylene with an Mn of up to 4 million. See Sassmannshausen, Bochmann, Rosch, Lilge, J. Organomet. Chem. (1997) 548, 23-28.

When using the catalysts, the total catalyst system will generally additionally comprise one or more organo-metallic compound as scavenger. Such compounds as used in this application is meant to include those compounds effective for removing polar impurities from the reaction environment and for increasing catalyst activity. Preferred scavengers include tri-ethylaluminum, tri-isobutylaluminum, and or tri-n-octyl aluminum.

Preferably the polymerization reaction is conducted by reacting monomers in the presence of a catalyst system described herein at a temperature of from 0° C. to 200° C. for a time of from 1 second to 10 hours. Preferably homogeneous conditions are used such as a continuous solution process or a bulk polymerization process, optionally with excess monomer used as diluent. Preferably the continuous process uses some form of agitation to reduce concentration differences in the reactor and maintain steady state polymerization conditions. The heat of the polymerization reaction is preferably removed by cooling of the polymerization feed and allowing the polymerization to heat up to the polymerization, although internal cooling systems may be used.

The catalyst and/or activator and/or scavenger may be delivered to the respective reactor as a solution or slurry, either separately to the reactor, activated in-line just prior to the reactor, or pre-activated and pumped as an activated solution or slurry to the reactor.

In some embodiments the polymerization may use multiple catalyst, multiple activators or both. Likewise the polymerizations may occur in one or more reactors. In a preferred embodiment, polymerizations in different reactors may be conducted in the presence of the same catalysts and or activators and or scavengers, and in other embodiments be conducted in the presence of different catalysts and/or activators and/or scavengers. In a preferred embodiment, dual reactors may be used in series or parallel, see U.S. Pat. No. 6,207,756, column 8 line 20 through column 14, line 21.

In a preferred embodiment, a continuous solution polymerization process may be used to produce the random propylene polymers comprising, for example, propylene and one or more of ethylene, octene or a diene. The polymerization process preferably utilizes a metallocene catalyst, namely, 1,1'-bis(4-triethylsilylphenyl)methylene-(cyclopentadienyl) (2,7-di-tertiary-butyl-9-fluorenyl)hafnium dimethyl or dimethyl silyl bis(2-methyl-5-phenyl indenyl)$ZrMe_2$ with dimethylaniliniumtetrakis(pentafluorophenyl)borate as an activator. An organoaluminum compound, namely, tri-n-octylaluminum, may be added as a scavenger to the monomer feed streams prior to introduction into the polymerization process. For production of more crystalline polymers, dimethylsilylbis(indenyl)hafnium dimethyl may be used in combination with dimethylaniliniumtetrakis(pentafluorophenyl) borate.

Preferably the solution polymerization is conducted in a single, or in two, continuous stirred tank reactors connected in series with hexane used as the solvent. In addition, toluene may be added to increase the solubility of the co-catalyst. The feed is transferred to the first reactor where the exothermic polymerization reaction is conducted adiabatically at a reaction temperature between about 50° C. to about 220° C. Hydrogen gas may also be added to the reactors as a molecular weight regulator. If desired, polymer product is then transferred to the second reactor, which is also operated adiabatically at a temperature between about 50° C. to 200° C.

Additional monomers, solvent, metallocene catalyst, and activators can be fed to the second reactor. The polymer content leaving the second reactor is preferably from 8 to 22 wt percent. A heat exchanger then heats the polymer solution to a temperature of about 220° C. The polymer solution is then brought to a Lower Critical Solution Temperature (LCST) liquid-liquid phase separation which causes the polymer solution to separate into two liquid phases—an upper polymer lean phase and a lower polymer-rich phase. The upper lean phase contains about 70 wt % of the solvent and the lower polymer rich phase contains about 30 wt % polymer. The polymer solution then enters a low pressure separator vessel which operates at a temperature of about 150° C. and a pressure of 4-10 bar (58 to 145 psi) and flashes the lower polymer rich phase to remove volatiles and to increase the polymer content to about 76 wt %. A gear pump at the bottom of the flash vessel drives the polymer rich solution to a List devolatilizer. An extruder may be coupled to the end of the List devolatilizer whereby the polymer material is transferred to a gear pump which pushes the polymer material through a screen pack. Then the polymer may be cut into pellets and fed to a water bath. A spin dryer may be used to dry the polymer pellets, which preferably have a final solvent content of less than about 0.5 wt %.

As stated above, preferred random propylene polymers of the present invention may be prepared by polymerizing propylene and at least one $C_2$ or $C_4$-$C_{20}$ alpha olefin in the presence of a chiral metallocene catalyst with an activator and optional scavenger, most preferably ethylene and propylene. Preferred chiral metallocenes are those known to favor incorporation of propylene for the production of predominantly isotactic polypropylene pentads and statistically random incorporation of the alpha-olefin comonomer(s). The term "metallocene" and "metallocene catalyst precursor" are terms known in the art to mean compounds possessing a Group 4, 5, or 6 transition metal M, with a cyclopentadienyl (Cp) ligand or ligands which may be substituted, at least one non-cyclopentadienyl-derived ligand X, and zero or one heteroatom-containing ligand Y, the ligands being coordinated to M and corresponding in number to the valence thereof. The metallocene catalyst precursors generally require activation with a suitable co-catalyst (also referred to as an activator) in order to yield an active metallocene catalyst. An active metallocene catalyst refers generally to an organometallic complex with a vacant coordination site that can coordinate, insert, and polymerize olefins.

Preferred metallocenes for use herein include bridged and unbridged biscyclopentadienyl complexes where the cyclopentadienyl group is, independently, a substituted or unsubstituted cyclopentadienyl group, a substituted or unsubstituted indenyl group, or a substituted or unsubstituted fluorenyl group. Preferred metallocenes include those represented by the formula: $TCpCpMX_2$, where T is a bridging group such as a dialkyl silica group (such as dimethylsilyl) or a hydrocarbyl group (such as methyl, ethyl, or propyl), each Cp is, independently a substituted or unsubstituted cyclopentadienyl group, a substituted or unsubstituted indenyl group (preferably a 2, 4 or 2, 4, 7 substituted indenyl group), or a substituted or unsubstituted fluorenyl group, M is a group 4 metal (preferably Hf, Zr or Ti) and each X is independently a halogen or hydrocarbyl group (such as chlorine, bromine, methyl, ethyl, propyl, butyl, or phenyl).

Additionally preferred metallocenes for use herein include cyclopentadienyl (Cp) complexes which have two Cp ring systems for ligands. The Cp ligands preferably form a "bent sandwich complex" with the metal and are preferably locked into a rigid configuration through a bridging group. Such preferred cyclopentadienyl complexes may have the general formula:

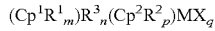

wherein $Cp^1$ of ligand $(Cp^1R^1_m)$ and $Cp^2$ of ligand $(Cp^2R^2_p)$ are preferably the same, $R^1$ and $R^2$ each are, independently, halogen, hydrocarbyl, halocarbyl, hydrocarbyl-substituted organometalloid or halocarbyl-substituted organometalloid group containing up to 20 carbon atoms;

m is preferably 1 to 5;

p is preferably 1 to 5;

preferably two $R^1$ and/or $R^2$ substituents on adjacent carbon atoms of the cyclopentadienyl ring associated there can be joined together to form a ring comprising from 4 to 20 carbon atoms;

$R^3$ is a bridging group;

n is the number of atoms in the direct chain between the two ligands and is preferably 1 to 8, most preferably 1 to 3;

M is a transition metal having a valence of from 3 to 6, preferably from group 4, 5, or 6 of the periodic table of the elements and is preferably in its highest oxidation state, each X is a non-cyclopentadienyl ligand and is, independently, a hydrocarbyl, oxyhydrocarbyl, halocarbyl, hydrocarbyl-substituted organometalloid, oxyhydrocarbyl-substituted organometalloid or halocarbyl-substituted organometalloid group containing up to 20 carbon atoms; and q is equal to the valence of M minus 2.

Numerous examples of the biscyclopentadienyl metallocenes described above for the invention are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,278,264; 5,296,434; and 5,304,614, all of which are incorporated by reference for purposes of U.S. patent practice.

Illustrative, but not limiting examples of preferred biscyclopentadienyl metallocenes of the type described in group 1 above for the invention include the racemic isomers of:

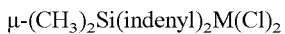
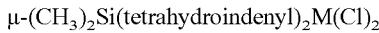
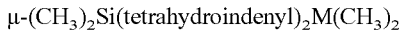
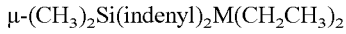
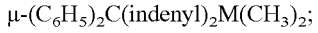

wherein M may include Zr, Hf, and/or Ti.

Preferably these metallocenes are used in combination with one or more alumoxanes (preferably methyl alumoxane, or modified methyl alumoxane) and/or one or more ionic activators such as N,N-dimethylanilinium tetraphenylborate, N,N-dimethylanilinium tetrakis(pentafluorophenyl)borate, diphenylcarbenium tetra(perfluorophenyl)borate, or N,N-dimethylanilinium tetrakis(heptafluoronaphthyl)borate.

Additional catalyst systems that may be useful herein to produce polymers useful as random propylene polymers include those described in WO 03/040095, WO 03/040201, WO 03/040202, WO 03/040233; WO 03/040442, and WO 04/041928. Likewise polymers useful as random propylene polymers are disclosed in WO 03/040095, WO 03/040201, WO 03/040202, WO 03/040233; WO 03/040442, and WO 04/041928.

Additional catalyst systems that may be useful herein to produce polymers useful as random propylene polymers and polymers useful as random propylene polymers include those described in Macromolecules, 2002, 35, 5742-5743, U.S. Pat. No. 6,878,790, WO 02/055566, EP 1 070 087, and WO 02/0246247.

Random Propylene Polymer Properties

Preferred random propylene polymers useful in the present invention have an average propylene content on a molar basis of from about 68 to 95 mol %, preferably from 70 mol % to about 92 mol %, more preferably from about 72 mol % to about 89 mol %, most preferably from about 75 mol % to about 87 mol %. The balance of the random propylene polymer may be one or more alpha-olefins from 4 to 8 carbon atoms as specified above, preferably ethylene, and/or one or more diene monomers.

Preferably, the random propylene polymer comprises about 5 to 32 mol % of a $C_2$ and/or a $C_4$-$C_{20}$ olefin more preferably 8 to 30 mol %, more preferably about 11 to about 28 mol %, with about 13 to 25 mol % being still more preferred.

The random propylene polymer may have a weight average molecular weight (Mw) of 5,000,000 or less, a number average molecular weight (Mn) of about 3,000,000 or less, a z-average molecular weight (Mz) of about 5,000,000 or less, and a g' index of 0.99 or greater measured at the weight average molecular weight (Mw) of the polymer using isotactic polypropylene as the baseline, all of which may be determined by size exclusion chromatography, e.g., 3D SEC, also referred to as GPC-3D as described herein.

In a preferred embodiment, the random propylene polymer may have a Mw of about 5,000 to about 5,000,000 g/mole, more preferably a Mw of about 10,000 to about 1,000,000, more preferably a Mw of about 20,000 to about 500,000, more preferably 30,000 to 500,000, more preferably a Mw of about 50,000 to about 300,000, wherein Mw is determined as described herein.

In a preferred embodiment, the random propylene polymer may have a Mn of about 5,000 to about 3,000,000 g/mole, more preferably a Mn of about 10,000 to about 1,000,000, more preferably a Mn of about 20,000 to about 500,000, more preferably 30,000 to 500,000, more preferably a Mn of about 50,000 to about 200,000, wherein Mn is determined as described herein.

In a preferred embodiment, the random propylene polymer may have a Mz of about 10,000 to about 5,000,000 g/mole, more preferably a Mz of about 50,000 to about 1,000,000, more preferably a Mz of about 80,000 to about 500,000, more preferably a Mz of about 100,000 to about 300,000, wherein Mz is determined as described herein.

The molecular weight distribution index (MWD=Mw/Mn) of the random propylene polymer may be about 1.5 to 40.0, more preferably about 1.8 to 5 and most preferably about 1.8 to 3. Techniques for determining the molecular weight (Mn and Mw) and molecular weight distribution (MWD) may be found in U.S. Pat. No. 4,540,753 (Cozewith, Ju and Verstrate) (which is incorporated by reference herein for purposes of U.S. practices) and references cited therein and in Macromolecules, 1988, volume 21, p 3360 (Verstrate et al.), which is herein incorporated by reference for purposes of U.S. practice, and references cited therein.

In a preferred embodiment, the random propylene polymer may have a g' index value of 0.99 or greater when measured at the Mw of the polymer using the intrinsic viscosity of isotactic polypropylene as the baseline. For use herein, the g' index is defined as:

$$g' = \frac{\eta_b}{\eta_l}$$

where $\eta_b$ is the intrinsic viscosity of the random propylene polymer and $\eta_l$ is the intrinsic viscosity of a linear polymer of the same viscosity-averaged molecular weight ($M_v$) as the random propylene polymer. $\eta_l = KM_v^\alpha$, K and α were measured values for linear polymers and should be obtained on the same instrument as the one used for the g' index measurement.

In a preferred embodiment, the random propylene polymer may have a crystallization temperature (Tc) measured with differential scanning calorimetry (DSC) of about 200° C. or less, more preferably, 150° C. or less.

In a preferred embodiment, the random propylene polymer may have a density of about 0.85 to about 0.92, more preferably, about 0.85 to 0.90 g/ml, more preferably about 0.85 to about 0.88 g/ml at room temperature as measured per the ASTM D-1505 test method.

In a preferred embodiment, the random propylene polymer may have a melt flow rate (MFR), which is inversely related to weight average molecular weight Mw, equal to or greater than 0.2 g/10 min., preferably between 0.5-500 g/10 min. and more preferably between 1-200 g/10 min., preferably 20-200 g/10 min. as measured according to the ASTM D-1238 test method.

In a preferred embodiment, the random propylene polymer may have a heat of fusion (Hf) determined according to the procedure described in ASTM E 794-85, which is greater than or equal to about 0.5 Joules per gram (J/g), and is less than or equal to about 70 J/g, preferably less than or equal to about 50 J/g, preferably less than or equal to about 35 J/g, preferably less than or equal to about 25 J/g. Preferably the random propylene polymers also have a heat of fusion that is greater than or equal to about 1 J/g, preferably greater than or equal to about 2.5 J/g, preferably greater than or equal to about 5 J/g according to the procedure described in ASTM E 794-85.

In a preferred embodiment, the propylene polymer has a % crystallinity of from 0.5 to 40, preferably 1 to 30, more preferably 5 to 25 wherein % crystallinity is determined according to the DSC procedure described herein. For use herein, the crystallinity of the random propylene polymer can also be expressed in terms of percentage of crystallinity. The thermal energy for the highest order of polypropylene is estimated at 189 J/g (i.e., 100% crystallinity is equivalent to 189 J/g.). In another embodiment, the random propylene polymer of the present invention preferably has a crystallinity of less than 40%, preferably about 0.25% to about 25%, more preferably from about 0.5% to about 22%, and most preferably from about 0.5% to about 20%.

In addition to this level of crystallinity, the random propylene polymer preferably has a single broad melting transition. However, random propylene polymer may show secondary melting peaks adjacent to the principal peak, but for purposes herein, such secondary melting peaks are considered together as a single melting point, with the highest of these peaks being considered the melting point of the random propylene polymer. The random propylene polymer preferably has a melting point of from about 25° C. to about 105° C., preferably about 25° C. to about 85° C., more preferably about 30° C. to about 70° C. Alternately, the random propylene polymer may have a melting point of from about 25 to 105° C., preferably from 25° C. to about 85° C., preferably from 25° C. to about 75° C., preferably about 25° C. to about 65° C., more preferably about 30° C. to about 80° C., more preferably about 30° C. to about 60° C.

The procedure for Differential Scanning Calorimetry is described as follows. About 6 to 10 mg of a sheet of the polymer pressed at approximately 200° C. to 230° C. is removed with a punch die. This is annealed at room temperature for at least 2 weeks. At the end of this period, the sample is placed in a Differential Scanning Calorimeter (TA Instruments Model 2920 DSC). In a nitrogen environment, the sample is first heated to 150° C. at 10° C./min and held at 150° C. for 5 min. It is then cooled to −50° C. at 20° C./min and held at −50° C. for 5 min. Finally it is heated again to 150° C. at 10° C./min. The thermal output during the first heat cycle, recorded as the area under the melting peak of the sample which is typically peaked at about 30° C. to about 175° C. and occurs between the temperatures of about 0° C. and about 200° C. is a measure of the heat of fusion expressed in Joules per gram of polymer. The melting point is recorded as the temperature of the greatest heat absorption within the range of melting of the sample.

Preferred random propylene polymer may have a Mooney viscosity ML (1+4)@125° C., as determined according to ASTM D1646, of less than 100, more preferably less than 75, even more preferably less than 60, most preferably less than 30.

Useful random propylene polymers preferably have an MFR (melt flow rate) of 0.5 to 200, especially from 1 to 100 or more especially 1 to about 50 (as measured by ASTM-1238, 2.16 kg. at 230° C. with a 1 minute preheat on the sample to provide a steady temperature for the duration of the experiment).

Preferred random propylene polymers used in embodiments of the present invention have a ratio of m to r (m/r) of more than 1. The propylene tacticity index, expressed herein as "m/r", is determined by 13C nuclear magnetic resonance (NMR). The propylene tacticity index m/r is calculated as defined in H. N. Cheng, *Macromolecules*, 17, 1950 (1984). The designation "m" or "r" describes the stereochemistry of pairs of contiguous propylene groups, "m" referring to meso and "r" to racemic. An m/r ratio of 0 to less than 1.0 generally describes a syndiotactic polymer, and an m/r ratio of 1.0 an atactic material, and an m/r ratio of greater than 1.0 an isotactic material. An isotactic material theoretically may have a ratio approaching infinity, and many by-product atactic polymers have sufficient isotactic content to result in ratios of greater than 50.

In a preferred embodiment, the preferred random propylene polymers have isotactic stereoregular propylene crystallinity. The term "stereoregular" as used herein means that the predominant number, i.e. greater than 80%, of the propylene residues in the polypropylene exclusive of any other monomer such as ethylene, has the same 1,2 insertion and the stereochemical orientation of the pendant methyl groups is the same, either meso or racemic.

Preferred random propylene polymer useful in this invention have an mm triad tacticity index of three propylene units, as measured by 13C NMR, of 75% or greater, 80% or greater, 82% or greater, 85% or greater, or 90% or greater. The mm triad tacticity index of a polymer is the relative tacticity of a sequence of three adjacent propylene units, a chain consisting of head to tail bonds, expressed as a binary combination of m and r sequences. It is usually expressed for semi-amorphous copolymers of the present invention as the ratio of the number of units of the specified tacticity to all of the propylene triads in the copolymer. The mm triad tacticity index (mm fraction) of a propylene copolymer can be determined from a 13C NMR spectrum of the propylene copolymer and the following formula:

$$mm \text{ Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

PPP(mm):

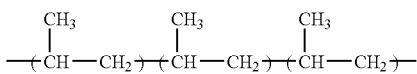

PPP(mr):

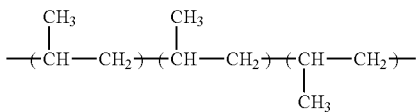

PPP(rr):

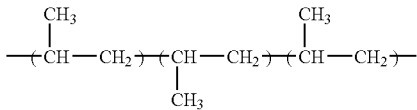

The 13C NMR spectrum of the propylene copolymer is measured as described in U.S. Pat. No. 5,504,172 and U.S. Pat. No. 6,642,316 (column 5, line 38 to column 9, line 18). The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum was assigned with reference to an article in the journal Polymer, Volume 30 (1989), page 1350 or an article in the journal Macromolecules, 17, (1984), 1950 (In the event of a conflict between the Polymer article and the Macromolecules article, the Polymer article shall control). In the first region, the methyl group of the second unit in the three propylene unit chain represented by PPP (mm) resonates. In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm). The calculation of the triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP(mr) and PPP(rr)) consisting of head-to-tail bonds can be obtained. Thus, the peak areas of PPP(mm), PPP(mr) and PPP(rr) can be evaluated, and hence the mm triad tacticity of the propylene unit chain consisting of head-to-tail bonds can be determined.

For further information on how the mm triad tacticity can be determined from a 13C-NMR spectrum of the polymer, as described by J. A. Ewen, "Catalytic Polymerization of Olefins", (the Ewen method); and Eds. T. Keii, K. Soga; Kodanska Elsevier Pub.; Tokyo, 1986, P 271, and as described in detail in U.S. Patent Application US2004/054086 filed Mar. 18, 2004 on page 8, all of which are incorporated by reference herein.

In another embodiment polymers that are useful in this invention as random propylene polymers include homopolymers and random copolymers of propylene having a heat of fusion as determined by Differential Scanning Calorimetry (DSC) of less than 70 J/g, an MFR of 50 dg/min or less, and contain stereoregular propylene crystallinity preferably isotactic stereoregular propylene crystallinity. In another embodiment the polymer is a random copolymer of propylene and at least one comonomer selected from ethylene, $C_4$-$C_{12}$ α-olefins, and combinations thereof. Preferably the random copolymers of propylene comprises from 10 wt % to 25 wt % polymerized ethylene units, based on the total weight of the polymer; has a narrow intermolecular composition distribution (e.g. 75% or more); has a melting point (Tm) of from 25° C. to 120° C., or from 35° C. to 80° C.; has a heat of fusion within the range having an upper limit of 70 J/g or 25 J/g and a lower limit of 1 J/g or 3 J/g; has a molecular weight distribution Mw/Mn of from 1.8 to 4.5; and has a melt flow rate of less than 40 dg/min, or less than 20 dg/min (as measured at 230° C., and 2.16 kg, ASTM D-1238).

A preferred random propylene polymer used in the present invention is described in detail as the "Second Polymer Component (SPC)" in co-pending U.S. applications U.S. Ser. No. 60/133,966, filed May 13, 1999, and U.S. Ser. No. 60/342, 854, filed Jun. 29, 1999, and described in further detail as the "Propylene Olefin Copolymer" in U.S. Ser. No. 09/346,460, filed Jul. 1, 1999, which are both fully incorporated by reference herein for purposes of U.S. practice. Random copolymers of propylene are available commercially under the trade name Vistamaxx™ (ExxonMobil, Baytown Tex.). Suitable examples include:

Vistamaxx™ 6100, Vistamaxx™ 6200 and Vistamax™ 3000.

In another embodiment, a random propylene polymer can be a blend of discrete polymers and/or copolymers. Such blends can include two or more polyethylene copolymers, two or more polypropylene copolymers, or at least one of each such polyethylene copolymer and polypropylene copolymer. Preferably, each of the random propylene polymers are described above and the number of random propylene polymers in a preferred embodiment may be three or less, more preferably two or less.

In an embodiment of the invention, the random propylene polymer may comprise a blend of two random propylene polymers differing in the olefin content. Preferably, one random propylene polymer may comprise about 7 to 13 mol % olefin, while the other random propylene polymer may comprise about 14 to 22 mol % olefin. In an embodiment, the preferred olefin in the random propylene polymers is ethylene.

Random propylene polymers can also be blended with processing oil and other common additives such as nucleating agents, antioxidants, fillers, nano-compositions, and the like, and may be fabricated into objects used in a variety of applications. Blends comprising random propylene polymers of this invention and other alpha-olefin polymers and copolymers, e.g., polypropylene, may also be fabricated into objects used in a variety of applications.

In a preferred embodiment, the propylene polymer may comprise a propylene based elastomeric polymer, produced by random polymerization processes leading to polymers having randomly distributed irregularities in stereoregular propylene propagation. This is in contrast to block copolymers in which constituent parts of the same polymer chains are separately and sequentially polymerized.

The term "elastomeric polymer" indicates that the heat of fusion of the polymer as determined by DSC is less than 75 J/g. Generally then the melting point as determined by DSC is below 105° C. This is in contrast to propylene copolymers or atactic polymers containing propylene derived units, which lack recovery from elastic deformation.

Functionalization of Random Propylene Polymers

The adhesive of the present invention comprises a functionalized random propylene polymer. The functionalized random propylene polymer comprises one or more functional groups. By "functionalized random propylene polymer" is meant that the random propylene polymer is contacted with a functional group, and, optionally, a catalyst, heat, initiator, and/or free radical source, to cause all or part of the functional group to incorporate, graft, bond to, physically attach to, and/or chemically attach to the random propylene polymer. Accordingly, in one aspect, the FRPP of the present invention comprises the contact product of a random propylene copolymer, a functional group, and a functionalization catalyst (such as a catalyst, heat, initiator or free radical source). Such functionalization is also referred to herein as grafting. Likewise, a functional group is also referred to herein as a grafting monomer. Further, "functionalized random propylene polymer" is also defined to include random propylene polymer directly polymerized from monomers comprising propylene and a monomer containing a functional group, (or using initiators having a functional group) to produce a random propylene polymer having a functional group.

For ease of reference herein, any functionalized polymer may be abbreviated herein using the format "AA-g-FG", wherein AA represents the specific type of polymer being functionalized (e.g., PP, iPP, random propylene polymer), FG refers to the functional group or compounds with which the polymer was functionalized (e.g., MA is maleic anhydride), and -g- represents grafting (i.e., attachment) between the two moieties. Accordingly, random propylene polymer-g-MA or RPP-g-MA represents random propylene polymer grafted with maleic anhydride.

By "functional group" is meant any compound with a weight average molecular weight of 1000 g/mol or less that contains a heteroatom and or an unsaturation. Preferred functional groups include any compound with a weight average molecular weight of 750 or less, that contain one or more a hetero atoms and or one or more sites of unsaturation. Preferably the functional group is a compound containing a heteroatom and an unsaturation, such as maleic anhydride or maleic acid. Preferred functional groups include organic acids and salts thereof, organic amides, organic imides, organic amines, organic esters, organic anhydrides, organic alcohols, organic acid halides (such as acid chlorides, acid bromides, etc.) organic peroxides, organic silanes, and the like.

Examples of preferred functional groups useful in this invention include compounds comprising a carbonyl bond such as carboxylic acids, esters of carboxylic acids, acid anhydrides, di-esters, salts, amides, and imides. Aromatic vinyl compounds, hydrolyzable unsaturated silane compounds, saturated halogenated hydrocarbons, and unsaturated halogenated hydrocarbons may also be used.

Examples of particularly preferred functional groups useful in this invention include, but are not limited, to maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride, and 4-methyl-4-cyclohexene-1,2-dicarboxylic anhydride, acrylic acid, methacrylic acid, maleic acid, fumaric acid, itaconic acid, citraconic acid, mesaconic acid, crotonic acid, bicyclo (2.2.2)oct-5-ene-2,3-dicarboxylic acid anhydride, 1,2,3,4,5, 8,9,10-octahydronaphthalene-2,3-dicarboxylic acid anhydride, 2-oxa-1,3-diketospiro(4.4)non-7-ene, bicyclo(2.2.1) hept-5-ene-2,3-dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, and x-methyl-bicyclo(2.2.1)hept-5-ene-2,3-dicarboxylic acid anhydride (XMNA).

Examples of esters of unsaturated carboxylic acids useful in this invention as functional groups include methyl acrylate, ethyl acrylate, butyl acrylate, methyl methacrylate, ethyl methacrylate, butyl methacrylate, glycidyl methacrylate, hydroxymethyl methacrylate, hydroxyethyl methacrylate and the like.

Examples of hydrolyzable unsaturated silane compounds useful as functional groups in this invention include compounds comprising a radical polymerizable unsaturated group and an alkoxysilyl group or a silyl group in its molecule, such that the compound has a hydrolyzable silyl group bonded to a vinyl group and/or a hydrolyzable silyl group bonded to the vinyl group via an alkylene group, and/or a compound having a hydrolyzable silyl group bonded to an ester or an amide of acrylic acid, methacrylic acid, or the like. Examples thereof include vinyltrichlorosilane, vinyl tris (beta-methoxyethoxy)silane, vinyltriethoxysilane, vinyltrimethoxysilane, gamma-methacryloxypropyltrimethoxysilane monovinylsilane and monoallylsilane. Examples of unsaturated halogenated hydrocarbons useful as functional groups include vinyl chloride and vinylidene chloride.

In a preferred embodiment, the functionalized random propylene polymer is grafted with maleic anhydride (MA), to produce random propylene polymer grafted with maleic anhydride (random propylene polymer-g-MA), wherein the maleic anhydride is covalently bonded to the backbone polymer chain of the polymer. The anhydride functionality grafted onto the polypropylene copolymer may remain as an anhydride, may be oxidized into acid functional groups, and/or may be further reacted by processes known in the art to induce other functional groups such as amides, amines, alcohols, and the like.

Formation of Functionalized Random Propylene Polymer

Multiple methods exist in the art that may be used for functionalizing random propylene polymers described herein. These include, but are not limited to, selective oxidation, free radical grafting, ozonolysis, epoxidation, and the like. The functionalized random propylene polymer of the present invention may be produced in a solution or a slurry process (i.e., with a solvent), or in a melt process (i.e., without a solvent). The functionalized random propylene polymer may also be prepared in a high shear mixer, a fluidized bed reactor, and/or the like.

Typically, the random propylene polymer is combined with a free radical initiator and a grafting monomer at a temperature, and for period of time sufficient to cause grafting of the monomer with the random propylene polymer to produce the functionalized random propylene polymer. In such an embodiment, the functionalized random propylene polymer of the present invention may be obtained by heating the random propylene polymer and a radical polymerizable functional group (e.g., maleic anhydride) in the presence of a radical initiator catalyst such as an organic peroxide. The combination is preferably heated at, near, or above the decomposition temperature of the radical initiator catalyst.

Useful radical initiator catalysts include: diacyl peroxides, peroxy esters, peroxy ketals, dialkyl peroxides, and the like. Specific examples include benzoyl peroxide, methyl ethyl ketone peroxide, tert-butyl peroxy benzoate, tert-butylperoxy acetate, OO-tert-butyl-O-(2-ethylhexyl)monoperoxy carbonate, n-butyl 4,4-di-(tert-butyl peroxy) valerate, 1,1-bis(tert-butylperoxy)cyclohexane, 1,1-bis(tert-butylperoxy)-3,3,5-trimethylcyclohexane, 2,2-bis(tert-butylperoxy)butane, dicumylperoxide, tert-butylcumylperoxide, a,a'-bis(tert-butylperoxy-isopropyl)benzene, di-tert-butylperoxide (DTBP), 2,5-dimethyl-2,5-di(tert-butylperoxy)-hexane, 2,5-dimethyl-2,5-di(tert-butylperoxy)-hexane, cyclohexanone peroxide, t-butylperoxyisopropyl carbonate, di-ti-butyl perphthalate, 2,5-dimethyl-2,5-di(t-butylperoxy)hexene, 2,5-dimethyl-2, 5-di(t-butylperoxy)hexene-3, di-t-butyl peroxide, cumene hydroperoxide, t-butyl hydroperoxide, hydroperoxides, dilauryl peroxide, dicumyl peroxide, and the like. In a preferred embodiment the functionalization is conducted at a temperature above the melting point of the polymer but below the decomposition temperature of the initiator. Useful temperature ranges include from 35° C. to 350° C., preferably from 40° C. to 250° C., preferably from 45° C. to 200° C.

A particularly preferred process for preparing the functionalized random propylene polymer of the present invention includes melt blending random propylene polymer in the substantial absence of a solvent, with a free radical generating catalyst, such as a peroxide catalyst, in the presence of the grafting monomer (e.g., maleic anhydride) in a shear-imparting reactor, such as an extruder reactor. One or more single screw and/or multiple screw reactors may be used, preferably twin screw extruder reactors such as co-rotating intermeshing extruders, counter-rotating non-intermeshing extruders, and/or co-kneaders such as those sold by Buss are especially preferred.

A preferred sequence of events used for functionalization (e.g., the grafting reaction) comprises the steps of melting the polymer, adding and dispersing the grafting monomer, introducing the peroxide catalyst, and venting the unreacted monomer and by-products resulting from the peroxide decomposition. Other sequences may include feeding the monomers and the peroxide catalyst pre-dissolved in a solvent. The monomer may be introduced into the reactor at a rate of about 0.01 to about 10 wt % of the total of the polymeric composition and functional group, and preferably at about 1 to about 5 wt % based on the total reaction mixture weight.

The grafting reaction is preferably carried out at a temperature selected to minimize or avoid rapid vaporization and consequent losses of the catalyst and monomer and to have residence times about 6 to 7 times the half life time of the peroxide. A temperature profile where the temperature of the polymer melt increases gradually through the length of the reactor up to a maximum in the grafting reaction zone of the reactor, and then decreases toward the reactor output is preferred. Temperature attenuation in the last sections of the extruder is desirable for product pelletizing purposes. In order to optimize the consistency of feeding, the peroxide is usually dissolved at an approximate 10% concentration in a mineral oil whereas the random propylene polymer and the grafting monomer are preferably fed neat.

The radical initiator catalyst is preferably used in a ratio of from 0.00001 to 100 wt %, more preferably from 0.1 to 10 wt %, based on the weight of the functional group. The heating temperature depends upon whether or not the reaction is carried out in the presence of a solvent, but it is usually from about 50° C. to 350° C.

In the solvent based process, the reaction may be carried out using the random propylene polymer in the form of a solution or a slurry having a concentration of from 0.1 to 50 wt % in the presence of a halogenated hydrocarbon compound having 2 to 20 carbon atoms, an aromatic compound, a halogenated aromatic compound, an alkyl substituted aromatic hydrocarbon, a cyclic hydrocarbon, and/or a hydrocarbon compound having 6 to 20 carbon atoms, which is stable to the radicals. Preferred solvents include hexane and cyclohexane.

The functionalized random propylene polymer may be a single polymer which has been functionalized as described herein. In another embodiment, the functionalized random propylene polymer of the present invention may be a blend comprising the random propylene polymer which is functionalized during a single process. The functionalized random propylene polymer of the present invention may also include a plurality of functionalized random propylene polymers and/or other polymers and/or additives, which have been combined after being individually functionalized, or any combination thereof. The grafting process may be performed in presence of other components that allow minimization of beta scission reactions such as styrene derivatives or others known to one of minimum skill in the art.

Properties of Functionalized Random Propylene Polymers

Unless stated otherwise, the properties of the functionalized random propylene polymer are measured in the same fashion as the same property prior to functionalization, as described herein. Various other techniques may also be used to characterize the functionalized random propylene polymers of this invention, some of which are described in "Structure Characterization" The Science and Technology of Elastomers, F. Eirich, editor, Academic Press 1978, Chapter 3 by G. Ver Strate which is incorporated by reference for purposes of U.S. Patent Practice.

In an embodiment, the random propylene polymer may be functionalized (e.g., grafted) to include about 0.001 wt % or more, preferably about 0.1 wt % or more of one or more functional groups attached to and/or incorporated into the random propylene polymer. The random propylene polymer may also be functionalized to a higher degree. The level of functionalization (e.g., the grafting level) may be less than about 50 wt %, preferably less than about 45 wt %, preferably less than about 40 wt %, preferably less than about 35 wt %, preferably less than about 30 wt %, preferably less than about 25 wt %, preferably less than about 20 wt %, preferably less than about 15 wt %, preferably less than about 10 wt %, preferably less than about 9 wt %, preferably less than about 8 wt %, preferably less than about 7 wt %, preferably less than about 6 wt %, preferably less than about 5 wt %, preferably less than about 4 wt %, preferably less than about 3 wt %, preferably less than about 2 wt %, preferably less than about 1.5 wt %, and preferably greater than about 0.5 wt %, more preferably greater than about 1 wt %. In a preferred embodiment, the functionalized polypropylene may comprise 0.1 to about 10 wt % of the functional group, more preferably 0.25 to about 5 wt % more preferably 0.5 to 4 wt %, more preferably 0.75 to 3.5 wt %, more preferably 1.0 to 2.5 wt %, more preferably 1.5 to 2.5 wt % of the functional group.

It has also been unexpectedly discovered herein that a compatibilizing effect within the inventive composition may be obtained by inclusion of the functionalized random propylene polymer, which may be influenced by the level of grafting of the random propylene polymer.

Preferably, the functionalized random propylene polymer comprises maleic anhydride (i.e., random propylene polymer-g-MA). The level of maleic anhydride in the random propylene polymer-g-MA may be less than about 50 wt %, preferably less than about 45 wt %, preferably less than about 40 wt %, preferably less than about 35 wt %, preferably less than about 30 wt %, preferably less than about 25 wt %, preferably less than about 20 wt %, preferably less than about 15 wt %, preferably less than about 10 wt %, preferably less than about 9 wt %, preferably less than about 8 wt %, preferably less than about 7 wt %, preferably less than about 6 wt %, preferably less than about 5 wt %, preferably less than about 4 wt %, preferably less than about 3 wt %, preferably less than about 2 wt % maleic anhydride. Also preferably the level of maleic anhydride in the random propylene polymer-g-MA may be greater than about 0.5 wt %, more preferably greater than about 1 wt % maleic anhydride. In a preferred embodiment, the functionalized polypropylene may comprise 0.1 to about 10 wt % of the maleic anhydride, more preferably 0.25 to about 5 wt % more preferably 0.5 to 4 wt %, more preferably 0.75 to 3.5 wt %, more preferably 1.0 to 2.5 wt % of the maleic anhydride.

The functional group content of the grafted random propylene polymer may be determined by Fourier Transformed Infrared spectroscopy based on a calibration with standards whose absolute functional group content has been determined. Specifically, the maleic anhydride content of the grafted random propylene polymer may be determined by Fourier Transformed Infrared spectroscopy based on a calibration with standards whose absolute maleic anhydride content has been determined according to the procedure described by M. Sclavons et al. (M. Sclavons, P. Franquinet, V. Carlier, G. Verfaillie, I. Fallais, R. Legras, M. Laurent, and F. C. Thyrion, *Polymer,* 41, 1989 (2000)) wherein a sample of random propylene polymer-g-MA polymer is first purified from residual monomer by complete solubilization in xylene followed by re-precipitation in acetone. This precipitated polymer is then dried. Approximately 0.5 g of the re-precipitated polymer is dissolved in 150 ml of toluene at boiling temperature. A potentiometric titration with TBAOH (tetrabutylammonium hydroxide) using bromothymol blue as the color indicator is performed on the heated solution in which the polymers do not precipitate during titration. The polymers are preferably pre-heated to 200° C. for 1 hour prior to dissolution in order to make sure that all diacid resulting from hydrolysis of maleic anhydride with ambient moisture has been converted back to the anhydride.

Preferably functionalized random propylene polymer, preferably random propylene polymer-g-MA, has a percent elongation at break of 300% or more, according to the procedure described in ASTM D 638 modified to use a "small" dumbbell having a base of about 1 cm×1 cm and a center, narrow strip of about 0.6 cm×0.2 cm, and a 850 µm per second separation speed. In a preferred embodiment, the random propylene polymer-g-MA of the present invention has a percent elongation at break in excess of 300%, more preferably in excess of 500% and even more preferably in excess of about 800%.

The stress-strain properties of the functionalized random propylene polymers may also be evaluated using a dumbbell shaped sample as is known in the art. The samples may be compression molded at 180° C. to 200° C. for 15 minutes at a force of 15 tons into a plaque of dimensions of 6 inches×6 inches. The cooled plaques may then be removed and the specimens may be cut with a die. The stress strain evaluation of the samples may be conducted on an Instron 4465, made by Instron Corporation of 100 Royal Street, Canton, Mass. For use herein, the digital data was collected in a file collected by the Series IX Material Testing System available from Instron Corporation and analyzed using Excel 5, a spreadsheet program available from Microsoft Corporation of Redmond, Wash.

Flexural modulus (secant 1%) was determined according to ASTM D790. Preferred functionalized random propylene polymer, preferably random propylene polymer-g-MA, has a low flexural modulus. Low flexural modulus is a 1% secant modulus less than 1400 MPa, more preferably less than 700 MPa, and more preferably less than 350 MPa.

Preferred PP-g-FG, (preferably RPP-g-MA) has a weight average molecular weight (Mw) of 5,000,000 or less, a number average molecular weight (Mn) of about 3,000,000 or less, a z-average molecular weight (Mz) of about 5,000,000 or less, and a g' index of 0.99 or greater measured at the weight average molecular weight (Mw) of the polymer using isotactic polypropylene (having an Mn of 64,000, an Mw of 304,000 and an Mz of 1,145,000) as the baseline (e.g., PP4612E2 polypropylene available from ExxonMobil Chemical Company in Houston, Tex.), all of which may be determined by size exclusion chromatography, e.g., 3D SEC, also referred to as GPC-3D as described herein.

In a preferred embodiment, the functionalized random propylene polymer, preferably random propylene polymer-g-MA polymer has an Mw of about 5,000 to about 5,000,000 g/mole, more preferably a Mw of about 10,000 to about 1,000,000, more preferably a Mw of about 20,000 to about 500,000, more preferably 30,000 to 500,000, a Mw of about 50,000 to about 300,000.

In a preferred embodiment, the functionalized random propylene polymer, preferably random propylene polymer-g-MA polymer has a Mn of about 5,000 to about 3,000,000 g/mole, more preferably a Mn of about 10,000 to about 1,000,000, more preferably a Mn of about 10,000 to about 500,000, more preferably 20,000 to 500,000, more preferably a Mn of about 10,000 to about 200,000.

In a preferred embodiment, the functionalized random propylene polymer, preferably random propylene polymer-g-MA polymer has a Mz of about 10,000 to about 5,000,000 g/mole, more preferably a Mz of about 50,000 to about 1,000,000, more preferably a Mz of about 80,000 to about 500,000, more preferably a Mz of about 100,000 to about 300,000.

The molecular weight distribution index (MWD=Mw/Mn) of the functionalized random propylene polymer, preferably random propylene polymer-g-MA polymer is preferably about 1.5 to 40.0, more preferably about 1.8 to 10 and most preferably about 1.8 to 7.

In a preferred embodiment, the functionalized random propylene polymer, preferably random propylene polymer-g-MA polymer has a g' index value of 0.99 or greater, more preferably a g' of about 1 (i.e., essentially linear) when measured at the Mw of the polymer using the intrinsic viscosity of isotactic polypropylene (having an Mn of 64,000, an Mw of 304,000 and an Mz of 1,145,000) as the baseline (e.g., PP4612E2 polypropylene available from ExxonMobil Chemical Company in Houston, Tex.).

In a preferred embodiment, the functionalized random propylene polymer, preferably random propylene polymer-g-MA polymer has a crystallization temperature (Tc) measured with differential scanning calorimetry (DSC) of about 200° C. or less, more preferably, 150° C. or less.

In a preferred embodiment, the functionalized random propylene polymer, preferably random propylene polymer-g-MA polymer has a density of about 0.85 to about 0.92 g/ml, more preferably, about 0.85 to 0.90 g/ml, more preferably about 0.85 to about 0.88 g/ml at room temperature as measured per the ASTM D-1505 test method.

In a preferred embodiment, the functionalized random propylene polymer, preferably random propylene polymer-g-MA polymer has a melt flow rate (MFR), equal to or greater than 0.2 g/10 min., preferably between 0.5-500 g/10 min., and more preferably between 1-200 g/10 min., preferably 20-200 g/10 min., as measured according to the ASTM D-1238 test method (2.16 kg, 230°).

In a preferred embodiment, the functionalized random propylene polymer, preferably random propylene polymer-g-MA polymer may have a heat of fusion (Hf) determined according to the procedure described in ASTM E 794-85, which is 75 J/g or less, more preferably 50 J/g or less, preferably 30 J/g or less, preferably 25 J/g or less, preferably between 0.5 and 75 J/g, preferably 1 and 40 J/g. Also the heat of fusion is preferably greater than or equal to about 1 J/g, preferably greater than or equal to about 5 J/g.

Functionalized Random Propylene Polymer Adhesive Compositions

The functionalized random propylene polymer, more preferably random propylene polymer-g-MA may be utilized as an adhesive alone, or as a blend in combination with at least one, preferably one or more additives. As used herein, the term "additive" is not meant to infer any relative proportion of the additive with respect to the total composition. Accordingly, an inventive adhesive blend composition may comprise 0.1 wt % to 99.9 wt % of an additive.

In an embodiment, the functionalized random propylene polymer, more preferably random propylene polymer-g-MA polymer of the present invention may be utilized either alone, or in combination with one or more additives, as an adhesive, or as a base polymer in an adhesive blend or composition.

Typically the functionalized RPP, preferably the RPP-g-MA, is present in the adhesive blend at from 0.1 to 99 wt %, based upon the weighted the adhesive blend, preferably 1 to 90 wt %, preferably 2 to 75 wt %, preferably 3 to 60 wt %, preferably 4 to 50 wt %, preferably 5 to 40 wt %.

Additives suitable for use in the inventive adhesive composition disclosed herein may comprise one or more random propylene polymer blend as described above, one or more iPP-g-aPP polymers as described below, $C_2$-$C_{40}$ polymers, elastomers, random copolymers, impact copolymers, tackifiers, crosslinking agents, antioxidants, neutralizing agents, nucleating agents, fillers, nano-clays, oils, plasticizers, waxes, low molecular weight polymers, ester polymers, and/or other additives. The preferred adhesive blends the iPP-g-aPP polymer may be present at 0.1 to 99 weight, preferably 1 to 95 wt %, prefer 5 to 90 wt %.

iPP-g-aPP Polymers

Polymers referred to herein as "iPP-g-aPP's" or "iPP-g-aPP polymers" useful in this invention are those described in U.S. Pat. No. 7,524,920 and U.S. Pat. No. 7,294,681, which are incorporated by reference herein. In particular, U.S. Pat. No. 7,524,920 and U.S. Pat. No. 7,294,681 provide specific instruction on how to produce the iPP-g-aPP polymers useful herein. In general preferred iPP-g-aPP's comprise a polypropylene prepared utilizing two or more catalysts (typically metallocene catalysts), wherein one catalyst is selected as being capable of producing essentially atactic polypropylene (aPP), and the other metallocene catalyst is selected as being capable of producing isotactic polypropylene (iPP) under the polymerization conditions utilized. Preferably, under the polymerization conditions utilized, incorporation of aPP and iPP polymer chains may occur within the in-reactor blend such that an amount of amorphous polypropylene present in the iPP-g-aPP polymer is grafted to isotactic polypropylene, represented herein as (aPP-g-iPP) and/or such that an amount of isotactic polypropylene present in the iPP-g-aPP polymer is grafted to amorphous polypropylene, represented herein as (iPP-g-aPP). In preferred embodiments, the iPP-g-aPP polymer may be present at 0.1 to 99 wt %, preferably 1 to 95 wt %, more preferably 5 to 90 wt %.

$C_2$-$C_{40}$ Polymers

In an embodiment, the adhesive composition may comprise various $C_2$-$C_{40}$ polyolefin polymers ("polymers"), which may comprise a single discrete polymer, or a blend of discrete polymers. Such blends may include two or more polyolefins such as polypropylene-polyethylene copolymers, two or more polypropylene copolymers, where each of the components of the polymer blend would individually qualify as an additive. In a preferred embodiment, the additive comprises random propylene polymer as described above.

In a preferred embodiment the adhesive composition may comprises a metallocene polyethylene (mPE) and/or metallocene polypropylene (mPP). The mPE and mPP homopolymers or copolymers are typically produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings by may substituted or unsubstituted. Several commercial products produced with such catalyst/activator combinations are commercially available from ExxonMobil Chemical Company in Baytown, Tex. under the tradenames EXCEED™, ACHIEVE™ and EXACT™. For more information on the methods and catalysts/activators to produce such mPE homopolymers and copolymers see WO 94/26816; WO 94/03506; EPA 277,003; EPA 277,004; U.S. Pat. No. 5,153,157; U.S. Pat. No. 5,198,401; U.S. Pat. No. 5,240,894; U.S. Pat. No. 5,017,714; CA 1,268,753; U.S. Pat. No. 5,324,800; EPA 129,368; U.S. Pat. No. 5,264,405; EPA 520,732; WO 92 00333; U.S. Pat. No. 5,096,867; U.S. Pat. No. 5,507,475; EPA 426 637; EPA 573 403; EPA 520 732; EPA 495 375; EPA 500 944; EPA 570 982; WO91/09882; WO94/03506 and U.S. Pat. No. 5,055,438.

In another embodiment, the adhesive composition may comprise homopolypropylene, propylene copolymerized with up to 50 wt % of ethylene or a $C_4$ to $C_{20}$ alpha-olefin, isotactic polypropylene, highly isotactic polypropylene (e.g., having greater than about 50% m-pentads), syndiotactic polypropylene, copolymers of propylene and ethylene and/or butene and/or hexene, polybutene, ethylene vinyl acetate, low density polyethylene (density 0.915 to less than 0.935 g/cm3) linear low density polyethylene, ultra low density polyethylene (density 0.86 to less than 0.90 g/cm3), very low density polyethylene (density 0.90 to less than 0.915 g/cm3), medium density polyethylene (density 0.935 to less than 0.945 g/cm3), high density polyethylene (density 0.945 to 0.98 g/cm3), copolymers of ethylene and methyl acrylate, copolymers of ethylene and acrylic acid, terpolymers of ethylene acrylic acid and methyl methacrylate, zinc, magnesium or sodium ionomers, polymethylmethacrylate or any other polymers polymerizable by a high-pressure free radical process, polyvinylchloride, polybutene-1, isotactic polybutene, ABS resins, elastomers such as ethylene-propylene rubber (EPR), vulcanized EPR, EPDM, block copolymer elastomers such as SBS, nylons (polyamides), polycarbonates, PET (polyester resins), crosslinked polyethylene, copolymers of ethylene and vinyl alcohol (EVOH), polymers of aromatic monomers such as polystyrene, graft copolymers generally, polyacrylonitrile homopolymer or copolymers, thermoplastic polyamides, polyacetal, polyvinylidene fluoride and other fluorinated elastomers, polyethylene glycols and polyisobutylene.

In a preferred embodiment, the adhesive composition may comprise a copolymer comprising propylene, one or more comonomers (such as ethylene, alpha-olefins having 4 to 8 carbon atoms, and styrenes) and optionally one or more α, ω dienes. The amount of diene is preferably no greater than about 10 wt %, more preferably no greater than about 5 wt %. Preferred dienes include those used for vulcanization of ethylene propylene rubbers, preferably ethylidene norbornene, vinyl norbornene, dicyclopentadiene, and 1,4-hexadiene.

In an embodiment, the adhesive composition may comprise two or more polypropylene copolymers, each of which preferably differ in α-olefin content, with one being in the range of 7 to 13 mol % α-olefin while the other is in the range of 14 to 22 mol % α-olefin. A preferred α-olefin is ethylene. In still another embodiment, the functionalized propylene polymer comprises 13 to 23 mol % ethylene. The use of two-polymer components may lead to beneficial improvements in the tensile-elongation properties of the final blends.

Polymers suitable for use in the adhesive composition as additives also include amorphous syndiotactic rich $C_3$-$C_{40}$ homopolymer or copolymer, and/or an at least partially crystalline syndiotactic rich $C_3$-$C_{40}$ homopolymer or copolymer. An at least partially crystalline polyolefin being defined as a polyolefin homopolymer or copolymer having at least 10 wt % solubility in xylene or toluene at room temperature. Preferably, the additive comprises a syndiotactic rich polyolefin, having a 15 wt %, preferably a 20 wt %, preferably a 25 wt %, preferably a 30 wt %, preferably a 35 wt %, preferably a 40 wt %, preferably a 45 wt %, preferably a 50 wt %, preferably a 55 wt %, preferably a 60 wt %, preferably a 65 wt %, preferably a 70 wt %, preferably a 75 wt %, preferably an 80 wt %, preferably an 85 wt %, preferably a 90 wt %, preferably a 95 wt % solubility in xylene or toluene at room temperature. Still more preferably, the syndiotactic rich polyolefin of the above additive comprises an at least partially crystalline syndiotactic rich polypropylene (srPP).

The at least partially crystalline syndiotactic rich polypropylene, (srPP) may be defined herein to comprise at least about 80% [r] dyads. Preferably at least about 85% [r] dyads, with at least about 90% [r] dyads preferred, with at least about 95% [r] dyads more preferred, with at least about 99% [r] dyads yet still more preferred. See U.S. 60/622,964 filed Oct. 28, 2004, which is incorporated by reference herein.

The additive may also include an at least partially crystalline syndiotactic rich polyolefin comprising polypropylene as the base polymer, along with other alpha olefins including ethylene ($C_2$) and from $C_4$ to $C_{40}$ alpha olefins. Examples of alpha olefins include butene-1, pentene-1, hexene-1, heptene-1, octene-1, nonene-1, decene-1, undecene-1, dodecene-1, tridecene-1, pentadecene-1, hexadecene-1, heptadecene-1, octadecene-1, and branched olefins including 3-methylbutene-1,4-methylepentene-1, and 4,4-dimethylepentene-1.

The amount of the other alpha olefins, when present in the at least partially crystalline syndiotactic rich polypropylene may be greater than about 0.001% by weight (wt %), based on the total weight of the polymer. Preferably, the amount of the other alpha olefins is greater than or equal to about 0.1 wt %, more preferably greater than or equal to about 1 wt %. The other alpha olefins may also be present in the base polymer at about 50 wt % or less. Preferably, the amount of the other alpha olefins is less than or equal to about 20 wt %, more preferably less than or equal to about 10 wt % in the base polymer.

In a preferred embodiment, any of the C2-C40 polymer listed above may be present at 0.1 to 99 wt %, preferably 1 to 95 wt %, more preferably 5 to 90 wt %.

Elastomers

In another embodiment the adhesive composition may comprise an elastomer. Examples of suitable elastomers include one or more polypropylene copolymers having elastic properties. Such preferred propylene copolymers having elastic properties may be prepared according the procedures in WO 02/36651 which is incorporated by reference here. Likewise, the additive may comprise polymers consistent with those described in WO 03/040202, WO 03/040095, WO 03/040201, WO 03/040233, and/or WO 03/040442. Additionally, the adhesive composition may comprise polymers consistent with those described in EP 1,233,191, and U.S. Pat. No. 6,525,157.

Other elastomers suitable for use as an additive in the adhesive composition include all natural and synthetic rubbers, including those defined in ASTM D 1566. In a preferred embodiment, elastomers may be rubber toughened compositions. In a particularly preferred embodiment, the rubber toughened composition is a two (or more) phase system where the rubber is a discontinuous phase within a continuous phase comprising the functionalized propylene copolymer. Examples of preferred elastomers include ethylene propylene rubber, ethylene propylene diene monomer rubber, neoprene rubber, styrenic block copolymer rubbers (including SI, SIS, SB, SBS, SIBS, SEBS, SEPS, and the like (S is styrene, I is isoprene, B is butadiene, EB is ethylenebutylene, EP is ethylenepropylene), butyl rubber, halobutyl rubber, copolymers of isobutylene and para-alkylstyrene, halogenated copolymers of isobutylene and para-alkylstyrene, polybutadiene, polyisoprene, styrene butadiene or thermoplastic elastomers. In another embodiment, the elastomers described above may be present in the adhesive compositions at 0.1 to 99 wt %, preferably 1 to 95 wt %, preferably 5 to 90 wt %.

Random Propylene Polymers (RPP's)

In another embodiment, the adhesive composition may comprise the random propylene polymers described herein, which have not been functionalized. The most preferred polymers have an ethylene content from 3 to 17 mol %. Preferred RPP's include those having a heat of fusion of less than 70 J/g (preferably more than 1 J/g and less than 60 J/g, more preferably less than 50 J/g, more preferably less than 40 J/g more preferably less than 30 J/g, more preferably less than 25 J/g) and an mm triad tacticity index as measured by 13C NMR of 75% or more (preferably 80% or more, preferably 85% or more, preferably 90% or more). In another embodiment, the RPP's described above may be present in the adhesive compositions at 0.1 to 99 wt %, preferably 1 to 95 wt %, preferably 5 to 90 wt %, based upon the weight of the composition.

Impact Copolymers

In another embodiment the adhesive composition may comprise one or more impact copolymers, also called heterophasic copolymers or block copolymers. Impact copolymers suitable for use herein may be defined to be a blend of isotactic PP and an elastomer such as an ethylene-propylene rubber. In a preferred embodiment the impact copolymer blend is present in a two (or more) phase system where the impact copolymer is a discontinuous phase in the adhesive composition and one or more of the other additives as described above, is the continuous phase. Preferred impact copolymers include those described at page 37, line 1 to page 41, line 31 of WO2004/014998. In another embodiment, the impact copolymers described above may be present in the adhesive composition at 0.1 to 99 wt %, preferably 1 to 95 wt %, preferably 5 to 90 wt %, based upon the weight of the composition.

Tackifiers

The adhesive composition may also include any tackifier known in the art. Examples of suitable tackifiers include: aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, and hydrogenated rosin esters. In some embodiments the tackifier may be hydrogenated.

In other embodiments, the tackifier may be non-polar, meaning that the tackifier is substantially free of monomers having polar groups. Preferably, the polar groups are not present, however if they are present, they are preferably not present at more that 5 wt %, preferably not more that 2 wt %, even more preferably no more than 0.5 wt %. In some embodiments the tackifier may have a Ring and Ball softening point, as measured by ASTM E-28 of 80° C. to 150° C., preferably 100° C. to 130° C. In another embodiment the tackifier is liquid and has a Ring and Ball softening point of between 10° C. and 70° C.

Preferred additives include hydrocarbon resins used as tackifiers or modifiers which include resins such as $C_5/C_6$ terpene resins, styrene terpenes, alpha-methyl styrene terpene resins, $C_9$ terpene resins, aromatic modified $C_5/C_6$, aromatic modified cyclic resins, aromatic modified dicyclopentadiene based resins or mixtures thereof. Additional preferred resins include those described in WO 91/07472, U.S. Pat. No. 5,571,867, U.S. Pat. No. 5,171,793 and U.S. Pat. No. 4,078,132. These resins may be obtained from the cationic polymerization of compositions containing one or more of the following monomers: $C_5$ diolefins (such as 1-3 pentadiene, isoprene, and the like); $C_5$ olefins (such as 2-methylbutenes, cyclopentene, and the like); $C_6$ olefins (such as hexene), $C_9$ vinylaromatics (such as styrene, alpha methyl styrene, vinyltoluene, indene, methyl indene, and the like); cyclics (such as dicyclopentadiene, methyldicyclopentadiene, and the like); and or terpenes (such as limonene, carene, thujone, and the like).

Also preferred additives include hydrocarbon resins used as tackifiers or modifiers which include resins obtained by the thermal polymerization of dicyclopentadiene, and/or the thermal polymerization of dimers or oligomers of cyclopentadiene and/or methylcyclopentadiene, and/or with vinylaromatics (such as styrene, alpha-methyl styrene, vinyl toluene, indene, methyl indene, and the like).

The resins obtained after polymerization and separation of unreacted materials, can be hydrogenated if desired. Examples of preferred resins for use as additives herein include those described in U.S. Pat. No. 4,078,132; WO 91/07472; U.S. Pat. No. 4,994,516; EP 0 046 344 A; EP 0 082 726 A; and U.S. Pat. No. 5,171,793.

In an embodiment, the adhesive composition of the present invention may comprise a tackifier comprising a hydrogenated aromatic modified resin produced from dicyclopentadiene feedstock, having a Ring and Ball softening point of 10° C. to 150° C. as determined according to ASTM E-28.

The tackifier may be present in the adhesive composition at about 1 to about 80 wt %, based upon the weight of the adhesive composition, more preferably 2 to 40 wt %, even more preferably 3 to 30 wt %.

Crosslinking Agents

In another embodiment the adhesive composition may further comprises a crosslinking agent. Preferred crosslinking agents include those having functional groups that can react with the functional group present on the random propylene polymer-g-FG, for example, the anhydride group present on random propylene polymer-g-MA. Preferred crosslinking agents include alcohols, multiols, amines, diamines and/or triamines, peroxide with or without co-agents. Particular examples of crosslinking agents useful in this invention include polyamines such as ethylenediamine, diethylenetriamine, hexamethylenediamine, diethylanilinopropylamine, and/or menthanediamine.

In a preferred embodiment, crosslinking agents as described above may be present in the adhesive composition at 10 wt % or less (based upon the weight of the composition) preferably at 0.1 to 5 wt %.

Antioxidants

In another embodiment, the adhesive composition may comprise one or more phenolic antioxidants. Preferred examples of phenolic antioxidants include substituted phenols such as 2,6-di-t-butylphenol in which a hydrogen atom at 2 and/or 6 position is substituted by an alkyl residue. Typical examples of the phenolic antioxidant include 2,6-di-t-butyl-p-cresol, 2,4,6-tri-t-butylphenol, vitamin E, 2-t-butyl-6-(3'-t-butyl-5'-methyl-2'-hydroxybenzyl)-4-methylphenyl acrylate, 2,2'-methylene-bis(4-methyl-6-t-butylphenyl), 2,2'-methylene-bis(4-ethyl-6-t-butyl-phenol), 2,2'-methylene-bis(6-cyclohexyl-4-methylphenol), 1,6-hexanediol-bis([3-(3,5-di-t-butyl[4-hydroxyphenyl])]propionate, and pentaerythrityl-tetrakis-[3-(3,5-di-t-butyl-4-hydroxyphenyl)]propionate. Preferred antioxidants include phenolic antioxidants, such as Irganox 1010, Irganox, 1076 both available from Ciba-Geigy. Secondary stabilizers such as organophosphites such as Irgafos 168 available from Ciba-Geigy can also be used. In a preferred embodiment the antioxidants described above may be present in the adhesive composition at 5 wt % or less (based upon the weight of the composition) preferably at 2.5 wt % or less preferably 1.0 wt % or less, preferably at 500 ppm or less.

Neutralizing Agents/Nucleating Agents

The adhesive composition of the present invention may also include a neutralizing agent such as calcium stearate, magnesium hydroxide, aluminum hydroxide or hydrotalcite, and/or a nucleating agent such as a salt of benzoic acid, sodium-2,2'-methylene-bis(4,6-di-t-butylphenyl)phosphate and benzyl sorbitol, and the like. In a preferred embodiment the neutralizing agents and or nucleating agents described above may be present in the adhesive composition at 5 wt % or less (based upon the weight of the composition) preferably at 2.5 wt % or less preferably 1.0 wt % or less, preferably at 500 ppm or less.

Fillers

In another embodiment, the adhesive composition may comprise fillers. Suitable fillers include titanium dioxide, calcium carbonate, barium sulfate, silica, wollastonite, silicon dioxide, carbon black, sand, glass beads or glass fibers, mineral aggregates, talc, clay, wolastonite, and the like. In a preferred embodiment, the fillers described above may be present at 20 wt % or less (based upon the weight of the composition), preferably 10 wt % or less, preferably 5 wt % or less, preferably between 0.5 and 5 wt %. In another embodiment, the adhesive does not comprise glass, preferably the adhesive does not comprise glass fibers or glass beads. By does not comprise is meant that the glass is present at less than 0.5 wt %, preferably less than 0.01 wt %.

Nanoclays

In another embodiment the adhesive composition may include a nanoclay (The combination of a polymer and a nanoclay is referred to as a nanocomposite). Preferably the adhesive composition comprises the RPP-g-MA and an organoclay.

The organoclay may comprise one or more of ammonium, primary alkylammonium, secondary alkylammonium, tertiary alkylammonium, quaternary alkylammonium, phosphonium derivatives of aliphatic, aromatic or arylaliphatic amines, phosphines or sulfides or sulfonium derivatives of aliphatic, aromatic or arylaliphatic amines, phosphines or sulfides.

The organoclay may be selected from one or more of montmorillonite, sodium montmorillonite, calcium montmorillonite, magnesium montmorillonite, nontronite, beidellite, volkonskoite, laponite, hectorite, saponite, sauconite, magadite, kenyaite, sobockite, svindordite, stevensite, vermiculite, halloysite, aluminate oxides, hydrotalcite, illite, rectorite, tarosovite, ledikite and/or florine mica.

The organoclay is preferably present in the nanocomposite at from 0.1 to 50 wt %, based on the total weight of the nanocomposite.

Adhesion Promoters

In another embodiment the adhesive composition may comprise one or more adhesion promoters including polar acids, polyaminoamides (such as Versamid 115, 125, 140, available from Henkel), urethanes (such as isocyanate/hydroxy terminated polyester systems, e.g. bonding agent TN/Mondur Cb-75 from Miles, Inc.), coupling agents, (such as silane esters (Z-6020 from Dow Corning)), titanate esters (such as Kr-44 available from Kenrich), reactive acrylate monomers (such as sarbox SB-600 from Sartomer), metal acid salts (such as Saret 633 from Sartomer), polyphenylene oxide, oxidized polyolefins, acid modified polyolefins, and anhydride modified polyolefins. Examples include silanes, titanates, organosylane, acrylics, acids, anhydrides, epoxy resins, hardening agents, polyamides, methylacrylates, epoxies, phenolic resins, polyisobutylene, aminoalkyl, mercaptoalkyl, epoxyalkyl, ureidoalkyl, carboxy, acrylate and isocyanurate functional silanes, mercaptopropyltrimethoxysilane, glycidoxpropyltrimethoxysilane, aminopropyltriethoxysilane, aminoethylaminopropyltrimethoxysilane, ureidopropyltrimethyloxysilane, bis-gamma-trimethoxysilylpropylurea, 1,3,5-tris-gamma-trimethoxysilylpropylisocyanurate, bis-gamma-trimethoxysilylpropylmaleate, fumarate and gamma-methacryloxypropyltrimethoxysilane, aminopropyltriethoxysilane, and combinations and derivatives thereof. In a preferred embodiment, the adhesion promoters described above may be present in the adhesive composition at 0.01 to 20 wt % (based upon the weight of the composition), preferably 0.1 to 10 wt % preferably 0.5 to 5 wt %.

Oils

The adhesive composition may also comprise oils including aliphatic napthenic oils, white oils, and the like. Particularly preferred oils include paraffinic or napthenic oils such as Primol 352, or Primol 876 available from ExxonMobil Chemical France, S.A. in Paris, France. In a preferred embodiment the oils described above may be present in the adhesive composition at 0.01 to 20 wt % (based upon the weight of the composition), preferably 0.1 to 10 wt % preferably 0.5 to 5 wt %.

Plasticizers

Preferred plasticizers suitable for use in the adhesive composition include mineral oils, polybutenes, phthalates and the like. Preferred plasticizers include phthalates such as di-iso-undecyl phthalate (DIUP), di-iso-nonylphthalate (DINP), dioctylphthalates (DOP) combinations thereof, and/or derivatives thereof, and/or the like. Particularly preferred plasticizers include polybutenes, such as Parapol 950 and Parapol 1300 formerly available from ExxonMobil Chemical Company in Houston Tex., as well as polyalpha olefins. In a preferred embodiment the plasticizers described above may be present in the adhesive composition at 0.01 to 20 wt % (based upon the weight of the composition), preferably 0.1 to 10 wt % preferably 0.5 to 5 wt %.

Waxes

Preferred waxes suitable for use in the adhesive composition include polar or non-polar waxes, polypropylene waxes, polyethylene waxes, and wax modifiers. Preferred waxes include ESCOMER™ 101. Particularly preferred waxes may be selected from the group consisting of: polar waxes, non-polar waxes, Fischer-Tropsch waxes, oxidized Fischer-Tropsch waxes, hydroxystearamide waxes, functionalized waxes, polypropylene waxes, polyethylene waxes, wax modifiers, amorphous waxes, carnauba waxes, castor oil waxes, microcrystalline waxes, beeswax, carnauba wax, castor wax, vegetable wax, candelilla wax, japan wax, ouricury wax, douglas-fir bark wax, rice-bran wax, jojoba wax, bayberry wax, montan wax, peat wax, ozokerite wax, ceresin wax, petroleum wax, paraffin wax, polyethylene wax, chemically modified hydrocarbon wax, substituted amide wax, and combinations and derivatives thereof. In some embodiments, the polar and non-polar waxes may be used together in the same composition. In a preferred embodiment the wax described above may be present in the adhesive composition at 0.01 to 20 wt % (based upon the weight of the composition), preferably 0.1 to 10 wt % preferably 0.5 to 5 wt %.

Low Molecular Weight Polymers

Other additives suitable for use in the adhesive composition include low molecular weight polymers (i.e., low Mn polymer, where low means below Mn of 5000, preferably below 4000, more preferably below 3000, even more preferably below 2500). Preferred low Mn polymers include polymers of lower alpha olefins such as propylene, butene, pentene, hexene and the like (e.g., a poly alpha olefin comprising propylene, butene, pentene, and/or hexene, having a number average molecular weight below 5000 g/mole). A particularly preferred polymer includes polybutene having an Mn of less than 1000. An example of such a polymer is available under the trade name PARAPOL™ 950 from ExxonMobil Chemical Company. PARAPOL™ 950 is a liquid polybutene polymer having an Mn of about 950 and a kinematic viscosity of 220 centi-Stokes (cSt) at 100° C., as measured by ASTM D 445. In a preferred embodiment the low molecular weight polymer described above may be present in the adhesive composition at 0.01 to 20 wt % (based upon the weight of the composition), preferably 0.1 to 10 wt % preferably 0.5 to 5 wt %.

Ester Polymers

In another embodiment the adhesive composition may comprise one or more ester polymers (polyesters). In a preferred embodiment the additive comprises a blend of two (or more) phase system, where the polyester is a discontinuous phase and the phase comprising the random propylene polymer-g-FG is the continuous phase. In a preferred embodiment the ester polymers described above may be present in the adhesive composition at 0.101 to 20 wt % (based upon the weight of the composition), preferably 0.1 to 10 wt % preferably 0.5 to 5 wt %.

Stabilizers

In another embodiment the adhesive composition may comprise one or more stabilizers. Stabilizers suitable for use herein include hindered phenols, sulfur phenols, phosphorous-containing phenols, 1,3,5-trimethyl-2,4,6-tris(3-5-di-tert-butyl-4-hydroxybenzyl)benzene, pentaerythritol tetrakis-3(3,5-di-tert-butyl-4-hydroxyphenyl)propionate, n-octadecyl-3(3,5-di-tert-butyl-4-hydroxyphenyl)propionate, 4,4'-methylenebis(4-methyl-6-tert butylphenol), 4,4'-thiobis(6-tert-butyl-o-cresol), 2,6-di-tert-butylphenol, 6-(4-hydroxyphenoxy)-2,4-bis(n-ocytlthio)-1,3,5-triazine, 2,4,6-tris(4-hydroxy-3,5-di-tert-butyl-phenoxy)-1,3,5-triazine, di-n-octadecyl-3,5-di-tert-butyl-4-hydroxybenzylphosphonate, 2-(n-octylthio)ethyl-3,5-di-tert-butyl-4-hydroxybenzoate, sorbitol hexa-(3,3,5-di-tert-butyl-4-hydroxy-phenyl) propionate, and combinations or derivatives thereof. In a preferred embodiment the stabilizers described above may be present in the adhesive composition at 0.01 to 20 wt % (based upon the weight of the composition), preferably 0.1 to 10 wt % preferably 0.5 to 5 wt %.

Other Additives

Other preferred additives suitable for use in the adhesive composition include block, antiblock, pigments, dyes, dyestuffs, processing aids, UV stabilizers, lubricants such as polydimethylsiloxane and calcium sterate, adjuvants, surfactants, color masterbatches, flow improvers, crystallization aids, plasticizers, oils, antioxidants, polymeric additives, defoamers, preservatives, thickeners, rheology modifiers, humectants, fillers, water, and the like. In a preferred embodiment the other preferred additives described above may be present in the adhesive composition at 0.01 to 20 wt % (based upon the weight of the composition), preferably 0.1 to 10 wt % preferably 0.5 to 5 wt %.

Polymeric additives may include homo poly-alpha-olefins, copolymers of alpha-olefins, copolymers and terpolymers of diolefins, elastomers, polyesters, block copolymers, ester polymers, acrylate polymers, alkyl acrylate polymers and vinyl acetate polymers. In a preferred embodiment the polymeric additives described above may be present in the adhesive composition at 0.01 to 99 wt % (based upon the weight of the composition), preferably 0.1 to 90 wt % preferably 0.5 to 80 wt %.

Adhesive Composition

The adhesive composition of the present invention comprises one or more functionalized random propylene polymers. In a preferred embodiment, the adhesive composition of the present invention comprises random propylene polymer-g-MA, which may be in combination with one or more additives as defined above, which have been combined such that the adhesive composition comprises 0.1 to 99.9 wt % additive, based upon the weight of the adhesive composition. Preferably, the adhesive composition comprises from 1 to 90 wt % additive, more preferably 20 to 80 wt % additive, more preferably from 30 to 80 wt % additive, more preferably from 40 to 80 wt % additive, still more preferably from 50 to 80 wt % additive, more preferably from 60 to 80 wt % additive, still more preferably from 70 to 95 wt % additive, based upon the weight of the adhesive composition with the balance blend made up of one or more functionalized random propylene polymers.

In the process utilized for producing the adhesive composition of the present invention, no particular restriction need be put on a mixing manner. Accordingly, the raw materials may be mixed uniformly by means of a Henschel mixer or the like and then may be melted, mixed and molded into pellets by an extruder or the like. It is also possible to utilize a Brabender mixer by which mixing and melting are carried out simultaneously, and after the melting, the material can be directly molded into films, sheets, or the like. Thus, the blends described herein may be formed using conventional techniques known in the art such that blending may be accomplished using one or more static mixers, in-line mixers, elbows, orifices, baffles, or any combination thereof.

In a preferred embodiment, the adhesive composition comprises a blend which includes about 1 to about 99 wt % functionalized random propylene polymer, based upon the total weight of the blend. Preferably the functionalized random propylene polymer is random propylene polymer-g-MA present at greater than about 5 wt %, preferably greater than about 10 wt %, preferably greater than about 20 wt %, preferably greater than about 30 wt %, preferably greater than about 40 wt %, preferably greater than about 50 wt %, preferably greater than about 60 wt %, preferably greater than about 70 wt %, preferably greater than about 80 wt %, preferably greater than about 90 wt %, based on the total weight of the adhesive composition.

In an embodiment the adhesive composition comprises less than 3 wt % anti-oxidant, less than 3 wt % of a low viscosity flow improver, less than 10 wt % wax, and/or less than 3 wt % of a crystallization aid. In some embodiments wax may not be desired and may be present at less than 5 wt %, preferably less than 3 wt %, more preferably less than 1 wt %, more preferably less than 0.5 wt %, based upon the weight of the adhesive composition.

In another embodiment the adhesive composition of this invention comprises RPP-g-MA, and less than 50 wt % total of any combination of the additives described above, preferably less than 25 wt %, preferably less than 20 wt %, preferably less than 15 wt %, preferably less than 10 wt %, preferably less than 5 wt %, based upon the weight of the adhesive composition.

In a particularly preferred embodiment the adhesive composition comprises (based upon the weight of the adhesive composition):

a) from 0.5 to 99 wt %, preferably from 1.0 to 50 wt % of functionalized random propylene polymer, preferably a RPP-g-MA, where the polymer has:
  1) a heat of fusion of 1 to 50 J/g (preferably 5 to 45 J/g) and an mm triad tacticity index of 80% or more (preferably 85% or more), and
  2) an Mw of 50,000 or more (preferably 100,000 or more) and/or
  3) a melting point of between 35° C. and 90° C., and/or
  4) an ethylene content of 10 to 25 wt % (preferably 1 to 20 wt %) (based upon the weight of the polymer); and/or
  5) a melt index (ASTM 1238, 190° C.) of 15 dg/min or less (preferably 10 or less); and/or
  6) a density between 0.85 and 0.89 g/cm$^3$; and
b) from 1 to 99.5 wt % of one or more additives, preferably 5 to 80 wt % of a polypropylene, preferably a RPP.

Properties of the Adhesive Composition

The adhesive composition of the present invention preferably has a T-peel adhesion to a non-polar substrate at 20° C. (e.g., isotactic polypropylene) of greater than about 175 N/m (1 lb/in) (as measured according to a modified ASTM D-1876, described below). Preferably, the T-peel adhesion to a polar substrate (e.g., Mylar and/or aluminum) is greater than about 75 N/m (1 lb/in) at 20° C., with greater than about 438 N/m being more preferred.

In a preferred embodiment, the adhesive has a T-peel adhesion at 20° C. to a polar substrate of at least 1.5 lb/in, preferably 2 lb/in (350N/m), more preferably 3 lb/in (525 N/m), still more preferably 4 lb/in (700 N/m) or more, and/or a T-peel adhesion to a non polar substrate at 20° C. of at least 1 lb/in, preferably 2 lb/in, more preferably 3 lb/in, still more preferably 4 lb/in or more (where 1 lb/in =175 N/m).

In a particularly preferred embodiment, the adhesive described herein has a T-peel adhesion to isotactic polypropylene at 20° C. of greater than about 595 N/m, a T-peel adhesion at 20° C. to aluminum of greater than about 700 N/m, and a T-peel adhesion at 20° C. to polyester of greater than about 192.5 N/m.

As demonstrated by fiber tear examples herein, the adhesive composition of the present invention provides excellent adhesion properties to cellulose and other materials of a similar polarity. The adhesive composition of the present invention preferably has a set time of less than about 10 minutes, with less than about 1 minute being more preferred, with less than about 30 seconds being still more preferred. Set time is defined for use herein as the time it takes for a compressed adhesive substrate construct to fasten together with enough adhesion so as to give substrate fiber tear when pulled apart, and thus the bond is sufficiently strong to remove the compression. The bond will likely still strengthen upon further cooling, however, it no longer requires compression. Set times are measured by placing a molten dot of adhesive on to a file folder substrate taped to a flat table. A file folder tab (1 inch by 3 inch (2.5 cm×7.6 cm)) is placed upon the dot 3 seconds later and compressed with a 500 gram weight. The weight is allowed to sit for about 0.5 to about 10 seconds. The construct thus formed is pulled apart to check for a bonding level sufficient to produce substrate fiber tear. The set time was recorded is the minimum time required for this bonding to occur. Standards of commercially available adhesives are used to calibrate this process.

The adhesive composition of the present invention preferably has a percent substrate fiber tear of from 97 to 100% at 25° C. and 50 to 100% at about −8 to about −30° C. Adhesive test specimens are created by bonding the substrates together with a portion (e.g., a dot) of molten adhesive and compressing the bond with a 500-gram weight until cooled to room temperature (about 25° C.). The dot size is controlled by the adhesive volume such that in most cases the compressed disk which forms gives a uniform circle just inside the dimensions of the substrates. The bonds are separated by hand and a determination made as to the type of failure observed. The amount of substrate fiber tear is expressed herein as a percentage.

Use of the Adhesive Composition

For any of the above described adhesive compositions, the final properties and the suitability for a particular applications may be altered by changing on the type of tacticity, (stereoregularity), the melting point, the average molecular weight, the molecular weight distribution, the type and level of monomer and comonomer, the sequence distribution, the presence or absence of any additional functionality, and the type and quantity of adhesion additives utilized therein.

The adhesive composition of this invention can be used in any adhesive application, including but not limited to, disposables, packaging, laminates, pressure sensitive adhesives, tapes, labels, wood binding, paper binding, non-wovens, road marking, reflective coatings, and the like.

Any of the substrates described herein, and/or the compositions of this invention, may be corona discharge treated, flame treated, electron beam irradiated, gamma irradiated, microwaved, or silanized.

The blends described herein may be formed using conventional techniques known in the art. For example, blending may be accomplished using one or more static mixers, in-line mixers, elbows, orifices, baffles, and any combination thereof.

Accordingly, in an embodiment, the adhesive composition of the present invention may comprise an adhesive composition, a package comprising the adhesive composition, wherein the adhesive is applied to at least a portion of one or more packaging elements selected from the group consisting of paper, paperboard, containerboard, tagboard, corrugated board, chipboard, kraft, cardboard, fiberboard, plastic resin, metal, metal alloys, foil, film, plastic film, laminates, and sheeting.

In another embodiment, a disposable article comprises the adhesive composition of the present invention, wherein the adhesive is applied to at least a portion of one or more disposable elements selected from the group consisting of non-woven fabrics, non-woven webs, non-elastic nonwoven fabrics, elastic nonwoven fabrics, necked-bonded laminates, stretch-bonded laminates, spunbond-meltblown-spunbond laminates, polypropylene spunbonded layers, polyethylene layers, combination polyethylene and polypropylene spunbonded layers, elastic strands, styrene-isoprene-styrene, styrene-butadiene-styrene, styrene-ethylene/propylene-styrene, styrene-co-butadiene-styrene, polyurethane, woven fabrics, polypropylene, polyester, body fluid impermeable backsheets, body fluid impermeable layers, body fluid permeable layers, body fluid permeable covers, absorbents, tissues, elastomeric materials, superabsorbent polymers, polyolefin films, polyester films, polyvinylchloride films, polyvinylidine chloride films, polyvinyl acetate films, elastic attachment tape, frontal tape backing, wood, paper, barrier films, film laminates, nonwoven composites, textile materials, woven materials, durable fabrics, absorbents, elastomeric strands, elastomeric webs, tissues, films, coverstock materials, nonwoven polyethylene, perforated polyethylene, superabsorbent polymers, filaments, porous webs, fibers, loop fastener material, spunbonded nonwoven articles, liners, elastic side panels, fastening tape, elastic bands, rayon, nylon, cellulosic pulp, cellulosic fluff, and/or superabsorbent batts.

The inventive adhesive composition may include a consumer good. In addition, a film may comprise the adhesive composition and further comprise an additional component selected from the group consisting of polyethylene, polypropylene, polyester, polyethylene terephthalate, polyvinyl chloride, polyvinylidine chloride, polyvinyl acetate, polyamides, paper, foil, metal, metal alloys, and combinations thereof. The adhesive composition disclosed herein may also comprise a pressure sensitive adhesive.

In an embodiment, the present invention may include a laminate article comprising two or more layers in combination with the inventive adhesive composition, preferably wherein at least one of the layers comprises one or more materials selected from the group consisting of wood, plastic, paper, rubber, thermoplastic, cardboard, metal, metal foil, metallized surfaces, cloth, non-wovens, spunbonded fibers, stone, plaster, glass, rock, ceramics, films, releasing paper, a releasing agent, foam, and a combination thereof.

In an embodiment, the present invention comprises the adhesive which is absent glass fibers. Accordingly, in an embodiment, the adhesive does not function as an adhesion promoter between a polar filler such as glass fibers, and a non-polar substrate.

In an embodiment, the adhesive of the present invention is disposed between two substrates to form a laminate. In another embodiment, glass fibers are absent in the adhesive of the present invention from which a laminate is comprised. A laminate of the present invention preferably comprises the adhesive of the present invention disposed between at least one polar surface and at least one non-polar surface.

In an embodiment, the present invention may include a fiber product comprising one or more fibrous materials in combination with the adhesive composition, wherein the fibrous material comprises one or more materials selected from the group consisting of cotton, hemp, cellulose esters, polyesters, wool, Kevlar, nylon, nomax, polyamides, poly acrylates, polyolefins, and combinations thereof. In addition, the present invention may comprise a hot melt adhesive, a carpet, and/or a tape.

In an embodiment, a roofing element comprises the adhesive composition, wherein the roofing element further comprises rubber, fiberglass, aramid, carbon, polyester, nylon, asphalt, fabric, aggregate, copper, steel, zinc, aluminum, and combinations thereof. The present invention may also include a reflective article comprising: a reflective material at least partially applied to a substrate surface.

In an embodiment, a tape comprising the adhesive composition may also include a backing element selected from the group consisting of polymeric films, polyester films, polyolefin-based films, polyurethane films, polyvinylchloride foam, polyethylene foam, nonwoven polyurethane, nonwoven polyester, knitted fabric, face stock, paper, synthetic polymeric material, plastic, polyolefins, such as polyethylene and polypropylene, polyester, polyethylene terephthalate, polyvinyl chloride, kraft paper, polymers, laminates, latex saturated paper, foil, litho stock, lightweight stock, styrene foam, laminated foam, expanded polystyrene foam, woven fabric, nonwoven fabric, cloth, creped paper, thermoplastic, and mixtures thereof.

The adhesive composition of the present invention is also suitable for use in a woodworking article, comprising the adhesive composition and a structural element, wherein the adhesive is applied to at least a portion of the structural element. The structural element of the woodworking article may also comprise wood, plywood, plastic, and/or veneer. Examples include lumber, hardwood, fiberboard, plasterboard, gypsum, wallboard, plywood, PVC, melamine, polyester, impregnated paper, and/or SHEETROCK™.

In an embodiment, a label for adhering to a substrate comprises the adhesive composition, a backing element, and a release liner, wherein the release liner is adhered to the backing element using the adhesive. In another embodiment, a bookbinding article comprises the adhesive composition and a binder element, preferably wherein the adhesive is applied to at least a portion of the binder element.

In an embodiment, a roadmarking composition comprises a binder comprising the adhesive composition, and one or more fillers selected from the group consisting of sand, pigments, glass beads, polymer-based beads, calcium carbonate, crushed marble, aggregate, dolomite, talc, glass pearls, prismatic reflectors, lens reflectors, calcite spar, silica sand, graphite, fly ash, cement dust, clay, feldspar, nepheline, fumed silica, alumina, magnesium oxide, zinc oxide, barium sulfate, aluminum silicate, calcium silicate, tianates, chalk, reflective inorganic fillers, extending fillers, beads, calcium sulfate, calcium metasilicate, quartz powder, calcined flint powder, mica, calcium silicate glass fibers, dyes, granite, plaster, slaked lime, alumina, diatomaceous earth, reflecting agents, modifiers, white lead, lithopone, chrome yellow, cadmium yellow, resin beads, polymeric gels, polymers, ceramic materials, crushed glass, stone, corundum, aluminum hydroxide, silicon oxide, glass bubbles, and zinc neodecanoate.

In another embodiment is a sealant composition comprising a sealant mixture comprising the adhesive composition, wherein the sealant mixture comprises one or more adhesion promoters selected from the group consisting of silanes, titanates, organosylane, acrylics, acids, anhydrides, epoxy resins, hardening agents, polyamides, methylacrylates, epoxies, phenolic resins, polyisobutylene, aminoalkyl, mercaptoalkyl, epoxyalkyl, ureidoalkyl, carboxy, acrylate and isocyanurate functional silanes, mercaptopropyltrimethoxysilane, glycidoxypropyltrimethoxysilane, aminopropyltriethoxysilane, aminoethylaminopropyltrimethoxysilane, ureidopropyltrimethyloxysilane, bis-gamma-trimethoxysilyl-propylurea, 1,3,5-tris-gamma-trimethoxysilylpropylisocyanurate, bis-gamma-trimethoxysilylpropylmaleate, fumarate and gamma-methacryloxypropyltrimethoxysilane, aminopropyltriethoxysilane, and combinations and derivatives thereof.

The present invention may also include a paving composition comprising asphalt, aggregate, and the adhesive composition. The adhesive composition may also be included in a glue stick comprising an elongated member, in a pipe wrapping article comprising the adhesive composition and a wrapping element, wherein the adhesive is at least partially disposed on or within the wrapping element. Also, in an embodiment, the present invention may include an article having a transparent pane, comprising one or more transparent panels and the adhesive composition applied to at least a portion of the one or more panels.

In a preferred embodiment of the present invention, an article comprises the adhesive as disclosed herein. The article may comprise a diaper, a feminine hygiene product, a nonwoven substrate, or the like. An embodiment of the present invention may also include a molded part, a fiber, a nonwoven fabric, or the like comprising the adhesive disclosed herein. In another embodiment, the present invention may include a fiber, a non-woven fabric, a molded article or the like which is at least partially coated with the adhesive disclosed herein.

The adhesive compositions may be applied to the desired substrate or adhered in any manner known in the art, particularly those methods used traditionally for packaging. Typically a coating head or nozzle, with associated equipment, for example those manufactured by Nordson Corporation, Duluth, Ga., are used. The compositions can be applied as fine lines, dots or spray coatings, in addition to other traditional forms as desired.

In a preferred embodiment of the present invention, the adhesive composition may then be applied directly to a substrate as a hot melt adhesive or may be sprayed thereon. Spraying is defined to include atomizing, such as producing an even dot pattern, spiral spraying such as Nordson Controlled Fiberization or oscillating a stretched filament like is done in the ITW Dynafiber/Omega heads or Summit technology from Nordson, as well as melt blown techniques. Melt blown techniques are defined to include the methods described in U.S. Pat. No. 5,145,689 or any process where air streams are used to break up filaments of the extrudate and then used to deposit the broken filaments on a substrate. In general, melt blown techniques are processes that use air to spin hot melt adhesive fibers and convey them onto a substrate for bonding. Fibers sizes can easily be controlled from 20-200 microns by changing the melt to air ratio. Few, preferably no, stray fibers are generated due to the inherent stability of adhesive melt blown applicators. Under UV light the bonding appears as a regular, smooth, stretched dot pattern. Atomization is a process that uses air to atomize hot melt adhesive into very small dots and convey them onto a substrate for bonding. In a preferred embodiment the adhesive composition is applied to a substrate using a spiral spray. Spiral spray is a method used for producing a filamentary spiral application. In one example the adhesive and spray air are mixed inside the nozzle, eliminating external influences on the spray pattern. In another example, the adhesive is drawn into a small fiber by high-velocity air jets. The fiber is then rotated by jets until it contacts the substrate, producing a helical pattern from the single strand of adhesive. In another preferred embodiment the adhesive composition is applied to a substrate using oscillation spraying. Oscillating the stretched filaments in the ITW Omega and Nordson Summit technologies is also obtained via multiple hot air jets oriented in the directions required to obtain the desired pattern. In some embodiments the adhesive composition is sprayed at a machine speed of no less than 50 m/min, preferably no less than 200 m/min, more preferably no less than 400 m/min, most preferably no less than 700 m/min. In another embodiment the adhesive composition being sprayed has a filament diameter of at least 0.2 mm and no more than 1.0 mm, preferably at least 0.3 mm and no more than 0.8 mm, most preferably at least 0.4 and no more than 0.6 mm. In another embodiment the adhesive composition being sprayed has a spiral diameter of at least 5 mm and no more than 40 mm, preferably at least 8 mm and no more than 30 mm, and most preferably at least 10 mm and no more than 20 mm. In a preferred embodiment the sprayed adhesive composition has an adhesion to nonwoven coverstock or polyethylene film at about 20° C. of at least 10 g/spiral, preferably at least 30 g/spiral, and most preferably at least 90 g/spiral.

In other embodiments, the adhesive compositions described herein may be coated onto a substrate such as a film, typically by techniques such as co-extrusion, lamination, solution coating, and the like. In some embodiments, the adhesive composition is a hot melt adhesive, in other embodiments the composition is a pressure sensitive adhesive, in other embodiments, the composition is a hot melt pressure sensitive adhesive.

Those skilled in the art will recognize other unnamed applications and processes which fall within the scope of this invention. It is not our intent to exclude such applications and processes which are apparent in light of our description, but merely offer helpful exemplification of our invention.

In an effort to further clarify our invention, we provide a brief history and examples of our own testing. This is provided as exemplification, and not for limitation.

EXAMPLES

Materials

The random propylene polymers were produced as described above in the "Random Propylene Polymer" section using metallocene catalyst (dimethylsilylbisindenyl hafnium dimethyl with dimethylaniliniumtetrakis (pentafluorophenyl)borate) in a solution process at about 70° C.

Functionalization of RPP-1, RPP-2 and RPP-3 was carried out in a non-intermeshing counter-rotating twin screw extruder (30 mm, L/D=48) by using the following conditions: 97.5-98.5 wt % of polymer, 1.5-2.5 wt % of Crystalman™ maleic anhydride fed at a rate of 7 kg/hr to the hopper of the extruder and 0.24-0.40 wt % of a 10% solution of Luperox™ 101 dissolved in Marcol™ 52 oil added to the second barrel. The screw speed was set at 125 rpm and the following temperature profile was used: 180, 190, 190, 190° C. with the die at 180° C. Excess reagents as well as peroxide decomposition products were removed with vacuum prior to the recovery of the polymer.

Properties of the RPP's and the random propylene polymer functionalized with a functional group (e.g., random propylene polymer functionalized with maleic anhydride (random propylene polymer-g-MA)) used herein are described in Table 1.

TABLE 1

| Material | Wt % MA | Wt % (Mol %)$C_2$ | $M_n$/1000 | $M_w$/1000 | mm Triad Tacticity Index | $M_z$/1000 | $\Delta H_f$ (J/g) |
|---|---|---|---|---|---|---|---|
| RPP-1 | | 15.5 (21.6) | 142 | 249 | 90.9 | 384 | 11 |
| RPP-2 | | 15.0 (20.9) | 82 | 136 | 88.0 | 200 | 14 |
| RPP-3 | | 11.0 (15.6) | 98 | 162 | 90.1 | 240 | 40 |
| RPP-g-MA-1 | 1.17 | 14.9 (20.8) | 19 | 88 | | 140 | |
| RPP-g-MA-4 | 1.98 | 14.4 (20.1) | 16 | 66 | | 103 | |
| RPP-g-MA-5 | 1.92 | 10.7 (15.2) | 17 | 74 | | 116 | |

The precursor polymer for random propylene polymer-g-MA-1 was random propylene polymer-1. The precursor polymer for random propylene polymer-g-MA-4 was a random propylene polymer with about 15 wt % $C_2$ similar to random propylene polymer-2. The precursor for random propylene polymer-g-MA-5 was a random propylene polymer with about 11 wt % $C_2$, similar to random propylene polymer-3.

The propylene-based polymers (iPP-g-aPP) are in-reactor blends of propylene homopolymers prepared with two metallocene catalysts, wherein a first catalyst, (e.g., di(p-triethylsilylphenyl)methylene(cyclopentadienyl)(3,8-di-t-butylfluorenyl)hafnium dimethyl), produces atactic polypropylene, (aPP), and wherein a second catalyst (e.g., rac-dimethylsilyl bis(2-methyl-4-phenylindenyl)zirconium dimethyl), produces isotactic polypropylene, (iPP). Two iPP-g-aPPs used in this invention were produced according to the method described in U.S. Pat. No. 7,294,681, and have the properties reported in Table 2.

TABLE 2

| | iPP-g-aPP-1 | iPP-g-aPP-2 |
|---|---|---|
| $T_c$, ° C. | 86 | 73 |
| $T_m$, ° C. | 138 | 133 |
| $T_g$, ° C. | −4 | |
| $\Delta H_f$, J/g | 30 | 30 |
| 190° C. η, cp | 6000 | 1700 |
| $M_n$ | 18,000 | 13,000 |
| $M_w$ | 48,000 | 38,000 |
| $M_z$ | 83,000 | 69,000 |
| mm triad % | | 43 |

The substrates used for adhesion studies are Mylar® polyester (thickness of 0.08 mm; used as received), aluminum (thickness of 0.10 mm; cleaned with acetone before use) and iPP (a cast film of PP 4612E2 having a thickness of 0.10 mm; an $M_n$ of 64,000; an $M_w$ of 304,000, and an $M_z$ of =1,145,000).

TABLE 3

| Composition | Polar/non-polar | Thickness | $M_n$ | $M_w$ | $M_z$ |
|---|---|---|---|---|---|
| iPP | Non-polar ($x^P \approx 0$) | 0.1 mm | 64,000 | 304,000 | 1,145,000 |
| Mylar® (Polyester) | Polar ($x^P = 0.22$) | 0.08 mm | | | |
| Aluminum (Al) | Polar | 0.1 mm | | | |

TABLE 4

| Escorez® 5380 | Hydrogenated resin produced from dicyclopentadiene feedstock, exhibiting a ring and ball softening point of 85° C. according to ASTM E-28 | ExxonMobil Chemical Company |
|---|---|---|
| Escorez® 5690 | hydrogenated aromatic modified resin produced from dicyclopentadiene feedstock, exhibiting a ring and ball softening point of 90° C. according to ASTM E-28 | ExxonMobil Chemical Company |
| C80 Sasolwax | Fischer-Tropsch wax | Sasol |

Experimental

Molecular weights of the polymers were measured using a Waters 150C GPC (column set: 3 Polymer Labs PL gel Mixed-B LS or equivalent) using 1,2,4-trichlorobenzene as the permeation solvent (polymer concentration ~3-4 mg/ml). Maleic acid contents of the maleated polymers were determined as follows. Approximately 0.5 g of the polymer was dissolved in 150 ml of toluene at boiling temperature. A potentiometric titration with TBAOH (tetra-butylammonium hydroxide) using bromothymol blue as the color indicator was performed on the heated solution in which the polymers did not precipitate during titration.

Solid-state NMR measurements were performed in a Bruker DSX 500 spectrometer, with a $^{13}C$ resonance frequency of 126.76 MHz, as a means of determining the $C_2$ contents of the various random propylene polymer and MA-random propylene polymers. A $^{13}C$ direct polarization/high-power $^1H$ decoupling pulse sequence was used. Spectra were acquired at 60° C. or higher to ensure most of the crystallites were melted. Recycle time was 20 seconds. The method may have a systematic error of up to 1 wt %.

The blends of iPP-g-aPP/E-5380 or iPP-g-aPP/E-5690 with RPP-g-MA were mixed thoroughly and homogeneously in the thermal cell of a Brookfield viscometer equipped with an electrically driven stirrer at 180° C. After mixing, blends were degassed in a vacuum oven (continuously purged by nitrogen) at 180° C. and subsequently cooled down to 25° C. Some blends were then molded into thin sheets of material with thickness about 0.4 mm using a molding temperature of 180° C. and a molding time of 15 min. For the preparation of the T-peel specimens, the thin sheet of molded sample was laminated between two pieces of polyester substrate or aluminum foil in a positive pressure, Teflon-coated mold. The bonding temperature was 180° C. and the bonding time was 30 seconds. For the case of the iPP substrate, the bonding temperature was 150° C. and the bonding time was 30 seconds. These laminates were then cut into one half inch (1.3 cm) wide specimens. T-peel measurements were performed after about 12 hr at room temperature (approx 20° C.) and at a separation speed of 2 inches per minute (850 μm/s). Also, repeat T-peel measurements were performed after the laminates were conditioned for two weeks by using the same test temperature and test speed. Adhesion was measured by the average T-peel adhesion, F/w, where F is the average peel force and w is the width of the test specimen.

For stress-strain measurements, the polymeric compositions were molded at 180° C. for 15 min into a pad with a thickness of about 2 mm. The test specimen was die-cut from a small dumbbell (the base is ~1 cm×1 cm and the center, narrow strip is ~0.6 cm×0.2 cm). Measurements using triplicate samples were performed at room temperature and at a separation speed of two inches per minute (850 μm/s) in an Instron Tester. The toughness is defined as the area under the stress-strain curve.

Set time is the time it takes for a compressed adhesive/substrate laminate to bond together with sufficient adhesion so that substrate fiber tear occurs when pulled apart. It was measured by placing a molten dot of adhesive on a file folder substrate taped to a flat surface. The file folder used was a typical manila letter size (⅓ cut) stock having a minimum of 10% post consumer recycle paper content (Smead Paper, stock number 153L, UPC number 10330). A file folder tab (1 inch×3 inch (2.5 cm×7.6 cm)) was placed on the dot 3 seconds later and compressed with a 500-gram weight for about 0.5-1 seconds. The laminate thus formed was pulled apart to check for a bonding level sufficient to produce substrate fiber tear. The set time was recorded as the minimum time required for this bonding to occur. Standards of commercially available adhesive Advantra 9250 (a commercial blend of $C_2/C_8$ metallocene polymers, tackifiers, and wax from H. B. Fuller), were used to calibrate this process.

For adhesion to cardboard, the Inland paper board (high performance box board from Inland Paper Board and Packaging Company of Rome) was used. Test specimens were prepared by bonding 2 pieces of the substrate together with a dot of molten adhesive and compressing the bond with a 500-gram weight until cooled to room temperature. Upon compression, a uniform circle of adhesive was formed between the substrates. This laminate was then peeled open in order to assess the effectiveness of the bond. Once a bond failed to a paper substrate, the effectiveness of the bond was quantified by estimating the area of the adhesive dot that retained paper fibers as the laminate failed along the bond line. This estimate is referred as the % fiber tear. For adhesion tested at room temperature, the specimens were conditioned at ambient conditions. For low temperature adhesion, they were placed in a freezer or refrigerator to obtain the desired test temperature. In all cases, the bond was separated by hand and the type of failure was observed. The amount of substrate fiber tear is expressed as a percentage. A zero % fiber tear under the above conditions signifies a loss of adhesion.

Shore A hardness was measured according to ASTM D 2240. Brookfield viscosity was measured at 170° C. according to ASTM D3236. The T-Peel results indicate triplicate analysis. The following representations are utilized in Tables I and II:

TABLE I

Adhesion of Neat RPP and RPP-g-MA:

| | Polymer | | | | | |
|---|---|---|---|---|---|---|
| | RPP-1 Comparative Sample 1 | RPP-g-MA-1 Sample-1 | RPP-2 Comparative Sample 2 | RPP-g-MA-4 Sample-2 | RPP-3 Comparative Sample 3 | RPP-g-MA-5 Sample-3 |
| T-Peel to Mylar, N/m (lb/in) at approx. 20° C. | | | | | | |
| After 12 hr | 7.35 (0.042)* | 1,725.9 (9.862)* | 15.75 (0.090)* | 2612.8 (14.93)† | 18.55 (0.106)* | 200 (1.143)* |
| After 2 Weeks | 2.45 (0.014)* | 1960 (11.20)* | 6.83 (0.039)* | 2917 (16.67)† | 2.28 (0.013)* | 472.2 (2.698)* |
| T-Peel to Al, N/m (lb/in) at approx. 20° C. | | | | | | |
| After 12 hr | 43.1 (0.246)* | 5,168 (29.53)* | 45.0 (0.257)* | 7,739 (44.22)† | 29.4 (0.168)* | 9,086 (51.92)† |
| After 2 Weeks | 0* | 6,370 (36.40)* | 0* | >7,000 (>40)††† | 0* | >7,000 (>40)††† |
| T-Peel to iPP, N/m (lb/in) at approx. 20° C. | | | | | | |
| After 12 hr | 3518 (20.10)† | 3953 (22.59)†† | 3393 (19.39)† | 3824 (21.85)† | 3574 (20.42)† | 4,165 (23.80)†† |
| After 2 Weeks | 3,647 (20.84)† | 4,305 (24.60)* | 3,354 (19.17)† | 3,134 (17.91)† | 3,861 (22.06)† | 4,487 (25.64)* |
| 100% Modulus, MPa | 1.86 | 1.60 | 2.32 | 1.55 | 1.63 | 3.99 |
| Tensile Strength at Break, MPa | 14.1 | 8.40 | 13.2 | 5.73 | 8.46 | 11.9 |
| Percent Elongation at Break, % | 950 | 1,070 | 1,000 | 1,010 | 770 | 770 |
| Toughness, MPa | 77 | 63 | 89 | 47 | 42 | 74 |

TABLE II

Adhesion of Formulated RPP and RPP-g-MA

| Formulation | Comparative Sample 4 Wt % | Comparative Sample 5 Wt % | Sample 5 Wt % | Comparative Sample 6 Wt % | Sample 6 Wt % | Comparative Sample 7 Wt % | Sample 7 Wt % |
|---|---|---|---|---|---|---|---|
| iPP-g-aPP-1 | 90 | 72 | 72 | 72 | 72 | 72 | 72 |
| E-5380 | 10 | 8 | 8 | 8 | 8 | 8 | 8 |
| RPP-1 | — | 20 | — | — | — | — | — |
| RPP-g-MA-1 | — | — | 20 | — | — | — | — |
| RPP-2 | — | — | — | 20 | — | — | — |
| RPP-g-MA-4 | — | — | — | — | 20 | — | — |
| RPP-3 | — | — | — | — | — | 20 | — |
| RPP-g-MA-5 | — | — | — | — | — | — | 20 |
| T-Peel to Mylar, N/m (lb/in) at approx. 20° C. | | | | | | | |
| After 12 hr | 8.75 (0.050)* | 16.1 (0.092)* | 2,170 (12.40)† | 16.98 (0.097)* | 447.3 (2.556)† | 9.3 (0.053)* | 2,147 (12.27)† |
| After 2 Weeks | 4.7 (0.027)* | 8.4 (0.048)* | 3,169 (18.11)† | 13.1 (0.075)* | 1,263 (7.215)* | 3.5 (0.020)* | 1,746 (9.979)*** |
| T-Peel to iPP, N/m (lb/in) at approx. 20° C. | | | | | | | |
| After 12 hr | 704 (4.023)† | 762 (4.354)* | 1,211 (6.922)† | 1,302 (7.439)*** | 651 (3.720)* | 2,994 (17.11)† | 810 (4.630)† |
| After 2 Weeks | 632 (3.609)† | 760 (4.340)† | 1534 (8.766)* | 1701 (9.722)† | 600 (3.426)* | 3,032 (17.33)† | 719 (4.111)* |

TABLE III

RPP-g-MA in Packaging Hot Melt Adhesives

| Formulation | Comparative Sample 8 (Wt %) | Sample 4 (Wt %) | Sample 9 (Wt %) |
|---|---|---|---|
| iPP-g-aPP-2 | 80 | 75 | 75 |
| E-5690 | 10 | 10 | 10 |
| C80 Sasolwax | 10 | 10 | 10 |
| RPP-g-MA-4 | — | 5 | — |
| RPP-g-MA-5 | — | — | 5 |
| Performance | | | |
| Brookfield Viscosity at 170° C. cp | 1700 | 2300 | 2100 |
| Set Time, seconds | 3 | 2.5 | 3.5 |
| % (Fiber Tear) from Inland Cardboard @ | | | |
| 25° C. | 96 | 99 | 99 |
| −8° C. | 0 | 65 | 3 |
| −30° C. | 13 | 80 | 8 |

Accordingly, the present invention relates to:
1. An adhesive composition comprising a functionalized random propylene polymer (FRPP), where the FRPP has at least 0.1 wt % of a functional group, (preferably maleic anhydride); a heat of fusion of between 0.5 and 70 J/g; and an mm triad tacticity index of at least 75%,
and wherein the adhesive composition has a T-Peel adhesion on a polar substrate at 20° C. of at least 175 N/m (1 lb/in) and a T-Peel adhesion on a non-polar substrate at 20° C. of at least 175 N/m (1 lb/in), and wherein the polarity of the polar substrate is at least 0.10 units higher than the polarity of the non-polar substrate (preferably at least 0.15, 0.20, 0.25, 0.30, 0.35, 0.40, 0.45, 0.50, 0.55, 0.60, 0.65, 0.70, 0.75, 0.80, 0.85, 0.90, or 0.95 units higher).
2. The adhesive of paragraph 1, wherein the FRPP comprises 0.1 wt % to 10 wt % of the functional group, (preferably 0.5 to 5 wt %).
3. The adhesive of paragraph 1 or 2, wherein the FRPP comprises from 5 to 32 mol % of one or more of ethylene, butene, pentene, hexene and/or octene.
4. The adhesive of paragraph 1, 2 or 3, wherein the FRPP has a percent elongation at break at 20° C. of 300% or more.
5. The adhesive of paragraph 1, 2 or 3 or 4, wherein the FRPP has a flexural modulus of less than 1400 MPa.
6. The adhesive of any of paragraphs 1 to 5, wherein the adhesive has a T-Peel adhesion on a polar substrate at 20° C. of at least 350 N/m (2 lb/in), preferably at least 525 N/m (3 lb/in), preferably at least 700 N/m (4 lb/in).
7. The adhesive of any of paragraphs 1 to 6, wherein the FRPP has an Mw of 5,000,000 or less, and/or an Mn of 3,000,000 or less, and/or an Mz of 10,000,000 or less.
8. The adhesive of paragraphs 1 to 7, wherein the FRPP has an Mw/Mn of 1.5 to 40.
9. The adhesive of paragraphs 1 to 8, wherein the FRPP has a branching index (g') of greater than 0.99.
10. The adhesive of paragraphs 1 to 9, wherein the FRPP has a crystallization temperature of about 200° C. or less.
11. The adhesive of paragraphs 1 to 10, wherein the FRPP has a melt flow rate greater than or equal to about 0.2 g/10 min.
12. The adhesive of paragraphs 1 to 11, wherein the FRPP has a heat of fusion of about 0.5 to about 25 joules per gram.
13. The adhesive of paragraphs 1 to 12, further comprising at least 0.1 wt % of an additive selected from the group consisting of an amorphous polypropylene polymer grafted to isotactic polypropylene polymer, a $C_2$-$C_{40}$ polymer, an elastomer, an impact copolymer, a tackifier, a crosslinking agent, an antioxidant, a neutralizing agent, a nucleating agent, a filler, an adhesion promoter, an oil, a plasticizer, a wax, an ester polymer, and a combination comprising one or more of the foregoing additives.
14. The adhesive of 1 to 13, further comprising at least 0.1 wt % of an additive selected from the group consisting of homopolypropylene, propylene copolymerized with up to 50 wt % of ethylene or a $C_4$ to $C_{20}$ alpha-olefin, isotactic polypropylene, isotactic polypropylene having greater than about 50% m-pentads, syndiotactic polypropylene, random copolymer of propylene and butane, random copolymer of propylene and hexene, polybutene, copolymer of ethylene and vinyl acetate, polyethylene having a density of 0.915 to less than 0.935 g/cm³, linear polyethylene having a density of 0.915 to less than 0.935 g/cm³, polyethylene having a density of 0.86 to less than 0.90 g/cm$^3$, polyethylene having a density of 0.90 to less than 0.915 g/cm$^3$, polyethylene having a density of 0.935 to 0.945 g/cm$^3$, polyethylene having a density of 0.945 to 0.98 g/cm$^3$, copolymer of ethylene and methyl acrylate, copolymers of ethylene and acrylic acid, polymethylmethacrylate, polyvinylchloride, polybutene-1, isotactic polybutene, ABS resin, ethylene-propylene rubber (EPR), vulcanized EPR, EPDM, SBS, polyamides, polycarbonates, crosslinked polyethylene, copolymers of ethylene and vinyl alcohol, polystyrene, polyesters, polyacrylonitrile homopolymer or copolymers, thermoplastic polyamides, polyacetal, polyvinylidene fluoride, polyethylene glycols, polyisobutylene, and combinations comprising one or more of the foregoing additives.

15. The adhesive of paragraphs 1 to 14, further comprising at least 0.1 wt % of a tackifier selected from the group consisting of an aliphatic hydrocarbon resin, an aromatic modified aliphatic hydrocarbon resin, a hydrogenated polycyclopentadiene resin, a polycyclopentadiene resin, a gum rosin, a gum rosin ester, a wood rosin, a wood rosin ester, a tall oil rosin, a tall oil rosin ester, a polyterpene, an aromatic modified polyterpene, a terpene phenolic, an aromatic modified hydrogenated polycyclopentadiene resin, a hydrogenated aliphatic resin, a hydrogenated aliphatic aromatic resin, a hydrogenated terpene, a modified terpene, a hydrogenated rosin acid, a hydrogenated rosin ester, and a combination comprising one or more of the foregoing tackifiers.

16. The adhesive of paragraphs 1 to 15, further comprising at least 0.1 wt % of a tackifier comprising a hydrogenated aromatic modified resin produced from dicyclopentadiene feedstock, having a Ring and Ball softening point of 10° C. to 150° C.

17. The adhesive of paragraphs 1 to 16, further comprising at least 0.1 wt % of a tackifier comprising a $C_5/C_6$ terpene resin, a styrene terpene resin, an alpha-methylstyrene terpene resin, a $C_9$ terpene resin, an aromatic modified $C_5/C_6$ resin, an aromatic modified cyclic resin, an aromatic modified dicyclopentadiene based resin, or a combination comprising one or more of the foregoing tackifiers.

18. The adhesive of paragraphs 1 to 17, further comprising at least 0.1 wt % of a tackifier comprising a resin obtained from cationic polymerization of compositions comprising $C_5$ diolefins, $C_5$ olefins, $C_6$ olefins, $C_9$ vinylaromatics, dicyclopentadiene, methyldicyclopentadiene, terpenes, or a combination thereof.

19. The adhesive of paragraphs 1 to 18, further comprising at least 0.1 wt % of a tackifier comprising a resin, or a hydrogenated resin obtained from thermal polymerization of dicyclopentadiene, dimers or oligomers of cyclopentadiene and/or methylcyclopentadiene, and/or with vinylaromatics, or a combination thereof.

20. The adhesive of paragraphs 1 to 19, further comprising at least 0.1 wt % of a crosslinking agent selected from the group consisting of alcohols, multiols, amines, diamines, triamines, polyamines, ethylenediamine, diethylenetriamine, hexamethylenediamine, diethylaniinopropylamine, menthanediamine, and a combination thereof.

21. The adhesive of paragraphs 1 to 20, further comprising at least 0.1 wt % of an antioxidant selected from the group consisting of 2,6-di-t-butyl-p-cresol, 2,4,6-tri-t-butylphenol, vitamin E, 2-t-butyl-6-(3'-t-butyl-5'-methyl-2'-hydroxybenzyl)-4-methylphenyl acrylate, 2,2'-methylene-bis(4-methyl-6-t-butylphenyl), 2,2'-methylene-bis(4-ethyl-6-t-butyl-phenol), 2,2'-methylene-bis(6-cyclohexyl-4-methylphenol), 1,6-hexanediol-bis([3-(3,5-di-t-butyl[4-hydroxyphenyl])]propionate, pentaerythrityl-tetrakis-[3-(3,5-di-t-butyl-4-hydroxyphenyl)]propionate, and a combination thereof.

22. The adhesive of paragraphs 1 to 21, further comprising at least 0.1 wt % of a neutralizing agent selected from the group consisting of calcium stearate, magnesium hydroxide, aluminum hydroxide, hydrotalcite, and a combination thereof.

23. The adhesive of paragraphs 1 to 22, further comprising at least 0.1 wt % of a nucleating agent selected from the group consisting of salts of benzoic acid, sodium salt of aromatic carboxylic acid, sodium-2,2'-methylene-bis(4,6-di-t-butylphenyl)phosphate, benzyl sorbitol, 3,4-dimethyl dibenzylidene sorbital acetal, disodium salt of cis-endo-bicylo (2.2.1) heptane-2,3-dicarboxylic acid, and a combination thereof.

24. The adhesive of paragraphs 1 to 23, further comprising at least 0.1 wt % of a filler and/or a nano-composition selected from the group consisting of titanium dioxide, calcium carbonate, barium sulfate, silica, silicon dioxide, carbon black, sand, glass beads, mineral aggregates, talc, clay, nanoclay, synthetic nanoclay, and a combination thereof.

25. The adhesive of paragraphs 1 to 24, further comprising at least 0.1 wt % an adhesion promoter selected from the group consisting of polar acids, polyaminoamides, urethanes, silane ester coupling agents, titanate esters, reactive acrylate monomers, metal acid salts, polyphenylene oxide, oxidized polyolefins, acid modified polyolefins, anhydride modified polyolefins, silanes, titanates, organosilane, acrylics, acids, anhydrides, epoxy resins, hardening agents, polyamides, methylacrylates, epoxies, phenolic resins, polyisobutylene, aminoalkyl, mercaptoalkyl, epoxyalkyl, ureidoalkyl, carboxy, acrylate and isocyanurate functional silanes, mercaptopropyltrimethoxysilane, glycidoxypropyltrimethoxysilane, aminopropyltriethoxysilane, aminoethylaminopropyltrimethoxysilane, ureidopropyltrimethyloxysilane, bis-gamma-trimethoxysilyl-propylurea, 1,3,5-tris-gamma-trimethoxysilylpropylisocyanurate, bis-gamma-trimethoxysilylpropylmaleate, fumarate and gamma-methacryloxypropyltrimethoxysilane, aminopropyltriethoxysilane, and combinations and derivatives thereof.

26. The adhesive of paragraphs 1 to 25, further comprising at least 0.1 wt % of an oil selected from the group consisting of an aliphatic oil, a napthenic oil, a white oil, and a combination thereof.

27. The adhesive of paragraphs 1 to 26, further comprising at least 0.1 wt % of a plasticizer selected from the group consisting of a mineral oil, a polybutene, a phthalate, and a combination thereof.

28. The adhesive of paragraphs 1 to 27, further comprising at least 0.1 wt % of a plasticizer selected from the group consisting of di-iso-undecyl phthalate, di-iso-nonylphthalate, dioctylphthalate, and a combination thereof.

29. The adhesive of paragraphs 1 to 28, further comprising at least 0.1 wt % of a wax selected from the group consisting of polypropylene wax, polyethylene wax, Fischer-Tropsch wax, oxidized Fischer-Tropsch wax, hydroxystearamide wax, functionalized wax, amorphous wax, microcrystalline wax, beeswax, vegetable wax, petroleum wax, paraffin wax, chemically modified hydrocarbon wax, substituted amide wax, a combination thereof, and a derivative of one or more of the foregoing waxes.

30. The adhesive of paragraphs 1 to 29, further comprising at least 0.1 wt % of one or more polymers having a number average molecular weight of 5000 or less, wherein the polymer comprises propylene, butene, pentene, hexene or a combination thereof.

31. The adhesive of paragraphs 1 to 30, further comprising a blend, wherein the blend has two or more phases, where a discontinuous phase comprises a polyester or a propylene-based polymer, and a continuous phase comprises the propylene copolymer functionalized with a functional group.

32. The adhesive of paragraphs 1 to 31, further comprising at least 0.1 wt % of a block, an antiblock, a pigment, a dye, a dyestuff, a processing aid, a UV stabilizer, a lubricant, an adjuvant, a surfactant, a color masterbatch, a flow improver, a crystallization aid, a stabilizer, a defoamer, a preservative, a thickener, a rheology modifier, a humectant, water, or a combination thereof.

33. The adhesive of paragraphs 1 to 32, comprising at least 0.1 wt % of one or more stabilizers selected from the group consisting of hindered phenols, sulfur phenols, phosphorous-containing phenols, 1,3,5-trimethyl-2,4,6-tris(3-5-di-tert-butyl-4-hydroxybenzyl)benzene, pentaerythritol tetrakis-3(3,5-di-tert-butyl-4-hydroxyphenyl)propionate, n-octadecyl-3(3,5-di-tert-butyl-4-hydroxyphenyl)propionate, 4,4'-methylenebis(4-methyl-6-tert butylphenol), 4,4'-thiobis(6-tert-butyl-o-cresol), 2,6-di-tert-butylphenol, 6-(4-hydroxyphenoxy)-2,4-bis(n-ocytlthio)-1,3,5-triazine, 2,4,6-tris(4-hydroxy-3,5-di-tert-butyl-phenoxy)-1,3,5-triazine, di-n-octadecyl-3,5-di-tert-butyl-4-hydroxybenzylphosphonate, 2-(n-octylthio)ethyl-3,5-di-tert-butyl-4-hydroxybenzoate, sorbitol hexa-(3,3,5-di-tert-butyl-4-hydroxy-phenyl)propionate, and combinations or derivatives thereof.

34. An article comprising the adhesive of any of paragraphs 1 to 33.

35. The article of paragraph 34 where the article is a disposable article, a consumer good, a film, a laminate article, a fiber product, a carpet, a tape, a roofing element, a reflective article, a woodworking article, a label for adhering to a substrate, a bookbinding article, a glue stick, a pipe wrap, an article having a transparent pane, or a combination thereof.

36. The adhesive of paragraphs 1 to 33, having a set time of 30 seconds or less.

37. The adhesive of paragraphs 1 to 33, wherein the FRPP comprises 68 to 95 mole percent propylene and 5 to 32 mole percent of a comonomer (preferably ethylene).

38. The adhesive of paragraphs 1-33, 36 or 37 wherein the adhesive of the adhesive has a T-peel adhesion at 20° C. to isotactic polypropylene of greater than about 595 N/m (3.4 lb/in), a T-peel adhesion at 20° C. to aluminum of greater than about 700 N/m (4.0 lb/in), and a T-peel adhesion at 20° C. to polyester of greater than about 192.5 N/m (1.1 lb/in).

39. A process to make the adhesive of any of paragraphs 1 to 33, 36, 37 or 38 comprising combining an FRPP having at least 0.1 wt % of a functional group; a heat of fusion of between 0.5 and 70 J/g; and an mm triad tacticity index of at least 75%, with one or more additives preferably selected from the group consisting of: an amorphous polypropylene polymer grafted to isotactic polypropylene polymer, a $C_2$-$C_{40}$ polymer, an elastomer, an impact copolymer, a tackifier, a crosslinking agent, an antioxidant, a neutralizing agent, a nucleating agent, a filler, a nano-composition, an adhesion promoter, an oil, a plasticizer, a wax, an ester polymer, and a combination comprising one or more of the foregoing additives to produce the adhesive, wherein the adhesive has a T-Peel adhesion on a polar substrate at 20° C. of at least 175 N/m (1 lb/in) and a T-Peel adhesion on a non-polar substrate at 20° C. of at least 175 N/m (1 lb/in).

40. An article comprising the adhesive of paragraphs of 1 to 33, 36 to 39 preferably where the article is a diaper or a feminine hygiene product.

41. A molded part, fiber, and/or nonwoven fabric comprising the adhesive of paragraphs 1-33, 36, 37, 38 or 39.

42. A fiber at least partially coated with the adhesive of paragraphs 1 to 33, 36 to 38.

43. A non-woven fabric at least partially coated with the adhesive of paragraphs 1 to 33, 36 to 38.

In another embodiment, this invention relates to:

1A. an adhesive composition comprising a functionalized random propylene polymer having at least 0.1 wt % of a functional group having a polar moiety, a heat of fusion of between 0.5 and 70 J/g; and an isotactic triad tacticity due to isotactic propylene derived sequences of from 65 to 99%, which composition is capable of providing adhesion to both polar and non-polar substrates as defined herein such that the T-Peel adhesion at 20° C. is at least 175 N/m on both polyester film (preferably Mylar®) of thickness of 0.08 mm and iPP cast film (preferably PP 4612E2 from ExxonMobil Chemical Company) having a thickness of 0.10 mm; an $M_n$ of 64,000; an $M_w$ of 304,000, and an $M_z$ of 1,145,000.

2A. Composition according to paragraph 1A wherein the polarity of the polar substrate is at least 0.10 units higher than the polarity of the non-polar substrate (preferably at least 0.15, 0.20, 0.25, 0.30, 0.35, 0.40, 0.45, 0.50, 0.55, 0.60, 0.65, 0.70, 0.75, 0.80, 0.85, 0.90, or 0.95 units higher).

3A. Composition according to paragraph 1A or 2A, wherein the functionalized random propylene polymer comprises from 0.5 wt % to 5 wt % of the functional group as measured by a quantitative stoichiometric reaction, optionally after hydrolysis of any anhydride (preferably, the functional group is maleic anhydride or hydrolyzed maleic anhydride).

4A. Composition according to any of the preceding paragraphs 1A to 3A wherein the functionalized random propylene polymer comprises a comonomer selected from ethylene, butene, pentene, hexene, and octene and preferably comprises 68 to 95 mole percent propylene and 5 to 32 mole percent of a comonomer based on the total weight of the polymer before functionalization.

5A. Composition according to any of the preceding paragraphs 1A to 4A in which the propylene polymer has a percent elongation at break at 20° C. of 300% or more and a flexural modulus of less than 1400 MPa before functionalization.

6A. Composition according to any of the preceding paragraphs 1A to 5A in which the composition is capable of providing adhesion to the polar substrate (preferably Mylar) of at least 350 N/m, preferably of at least 525 N/m and especially of at least 700 N/m (and preferably the composition is capable of providing adhesion to the non-polar substrate (preferably iPP) of at least 350 N/m, preferably of at least 525 N/m and especially of at least 700 N/m).

7A. Composition according to any of the preceding paragraphs 1A to 6A in which the functionalized random propylene polymer has an Mw of 5,000,000 or less, an Mn of 3,000,000 or less or an Mz of 5,000,000 or less and preferably has a Mw/Mn of 1.5 to 40.

8A. Composition according to any of the preceding paragraphs 1A to 7A in which the functionalized random propylene polymer has a branching index (g') index of greater than 0.99, a crystallization temperature of about 200° C. or less, a melt flow rate greater than or equal to 0.2 g/10 min and/or a heat of fusion of 0.5 to 25 joules per gram.

9A. Composition according to any of the preceding paragraphs 1A to 8A in which from 0.1 wt % to 5 wt % of an additive is present based on the weight of the composition selected from the group consisting of a crosslinking agent, an antioxidant, a neutralizing agent, a nucleating agent, an adhesion promoter, and a combination comprising one or more of the foregoing additives.

10A. Composition according to any of the preceding paragraphs 1A to 9A which from 1 to 30 wt % of an additive is present based on the weight of the composition selected from the group consisting of contains of a tackifier, a filler, an oil, a plasticizer, a wax and a combination comprising one or more of the foregoing additives.

11A. Composition according to any of the preceding paragraphs 1A to 10A in which from 1 to 30 wt % of an additive is present based on the weight of the composition selected from the group consisting of contains of non-grafted amorphous polymers having a heat of fusion of less than 70 J/g and/or grafted or ungrafted semi-crystalline polymers having a heat of fusion of at least 70 J/g 12A. Composition according to paragraph 11A in which the additional polymer is a homopolymer or copolymer of a ethylene or a C3 to C10 alpha-olefin, an amorphous polypropylene polymer grafted to isotactic polypropylene polymer, a copolymer of ethylene and a copolymerizable monomer containing an alcohol, carboxylic acid, ester or halide moiety and/or an ABS resin, SBS, polyamides, polycarbonates, polyesters, polyacrylonitrile homopolymer or copolymers, thermoplastic polyamides, polyacetal, polyvinylidene fluoride, polyethylene glycols, polyisobutylene, and combinations comprising one or more of the foregoing additives.

13A. Composition according to any of the preceding paragraphs 1A to 12A in which the adhesive of claim 1, further comprising a blend, wherein the blend has two or more phases, where a discontinuous phase comprises a polyester or a propylene-based polymer, and a continuous phase comprises the propylene copolymer functionalized with a functional group.

14A. An adhesive dispenser for dispensing the adhesive composition according to any of paragraphs 1A to 13A, preferably not containing glass fiber.

15A. Article comprising an adhesive composition according to any of paragraph 1A to 13A for adhering to another substrate.

16A. Film, laminated or coextruded, according to paragraph 15A with a layer of the adhesive composition on at least one surface.

17A. Multi-layer film, laminated or coextruded, comprising a layer of an adhesive composition according to any of paragraphs 1A to 13A between a polar and a non-polar layer.

18A. Multi-layer film, laminated or coextruded, according to paragraph 16A in which the polar substrate is aluminum, and the non-polar substrate is isotactic polypropylene.

19A. Fiber at least partially coated with an adhesive composition according to any of paragraphs 1A to 13A.

20A. Non-woven fabric at least partially coated with an adhesive composition according to any of paragraphs 1A to 13A.

21A. A diaper or feminine hygienic product according to paragraph 20A.

22A. A molded part comprising an adhesive composition according to any of paragraphs 1A to 13A.

In another embodiment of this invention, the adhesive blends described herein comprising less than 10 wt % of a polyamide, preferably less than 5 wt %, preferably less than 1 wt %, preferably 0 wt % of a polyamide, based upon the weight of the composition. In another embodiment of this invention, the adhesive blends described herein comprising less than 10 wt % of glass, preferably less than 5 wt %, preferably less than 1 wt %, preferably 0 wt % of glass, based upon the weight of the composition.

All documents described herein are incorporated by reference herein, including any priority documents and/or testing procedures to the extent they are not inconsistent with this invention. As is apparent from the foregoing general description and the specific embodiments, while forms of the invention have been illustrated and described, various modifications can be made without departing from the spirit and scope of the invention. Accordingly, it is not intended that the invention be limited thereby.

We claim:

1. An adhesive composition consists essentially of:
    from 5 to 40 wt %, by weight of the adhesive composition, of a functionalized random propylene polymer (FRPP), where the FRPP has at least 0.1 wt % of a functional group; a heat of fusion of between 0.5 and 70 J/g; and an mm triad tacticity index of at least 75%,
    from 1 to 95 wt %, by weight of the adhesive composition, of an amorphous polypropylene polymer grafted to isotactic polypropylene polymer;
    from 3 to 30 wt %, by weight of the adhesive composition, of a tackifier comprising a hydrogenated aromatic modified resin produced from dicyclopentadiene feedstock, having a Ring and Ball softening point of 10° C. to 150° C.; and
    up to 20 wt %, by weight of the adhesive composition, of a wax;
    wherein the adhesive composition has a T-Peel adhesion on a polar substrate at 20° C. of at least 175 N/m (1 lb/in) and a T-Peel adhesion on a non-polar substrate at 20° C. of at least 175 N/m (1 lb/in), and wherein the polarity of the polar substrate is at least 0.10 units higher than the polarity of the non-polar substrate.

2. The adhesive of claim 1, wherein the FRPP comprises 0.1 wt % to 10 wt % of the functional group.

3. The adhesive of claim 1, wherein the FRPP comprises from 5 to 32 mol % of one or more of ethylene, butene, pentene, hexene and/or octene.

4. The adhesive of claim 1, wherein the FRPP has a percent elongation at break at 20° C. of 300% or more.

5. The adhesive of claim 1, wherein the FRPP has a flexural modulus of less than 1400 MPa.

6. The adhesive of claim 1, wherein the adhesive has a T-Peel adhesion on a polar substrate at 20° C. of at least 350 N/m (2 lb/in).

7. The adhesive of claim 1, wherein the FRPP has an Mw of 5,000,000 or less, and/or an Mn of 3,000,000 or less, and/or an Mz of 10,000,000 or less.

8. The adhesive of claim 1, wherein the FRPP has an Mw/Mn of 1.5 to 40.

9. The adhesive of claim 1, wherein the FRPP has a branching index (g') of greater than 0.99.

10. The adhesive of claim 1, wherein the FRPP has a crystallization temperature of about 200° C. or less.

11. The adhesive of claim 1, wherein the FRPP has a melt flow rate greater than or equal to about 0.2 g/10 min.

12. The adhesive of claim 1, wherein the FRPP has a heat of fusion of about 0.5 to about 25 joules per gram.

13. The adhesive of claim 1, wherein the tackifier is a hydrogenated resin obtained from thermal polymerization of dicyclopentadiene, dimers or oligomers of cyclopentadiene and/or methylcyclopentadiene, and/or with vinylaromatics, or a combination thereof.

14. The adhesive of claim 1, further comprising at least 0.1 wt % of an antioxidant selected from the group consisting of 2,6-di-t-butyl-p-cresol, 2,4,6-tri-t-butylphenol, vitamin E, 2-t-butyl-6-(3'-t-butyl-5'-methyl-2'-hydroxybenzyl)-4-methylphenyl acrylate, 2,2'-methylene-bis(4-methyl-6-t-butylphenyl), 2,2'-methylene-bis(4-ethyl-6-t-butyl-phenol), 2,2'-methylene-bis(6-cyclohexyl-4-methylphenol), 1,6-hexanediol-bis([3-(3,5-di-t-butyl[4-hydroxyphenyl])]propionate, pentaerythrityl-tetrakis-[3-(3,5-di-t-butyl-4-hydroxyphenyl)]propionate, and a combination thereof.

15. The adhesive of claim 1, further comprising at least 2.5 wt % or less of a neutralizing agent selected from the group consisting of calcium stearate, magnesium hydroxide, aluminum hydroxide, hydrotalcite, and a combination thereof.

16. The adhesive of claim 1, further comprising at least 2.5 wt % or less of a nucleating agent selected from the group consisting of salts of benzoic acid, sodium salt of aromatic carboxylic acid, sodium-2,2'-methylene-bis(4,6-di-t-butylphenyl)phosphate, benzyl sorbitol, 3,4-dimethyl dibenzylidene sorbital acetal, disodium salt of cis-endo-bicylo (2.2.1) heptane-2,3-dicarboxylic acid, and a combination thereof.

17. The adhesive of claim 1, wherein the wax is selected from the group consisting of polypropylene wax, polyethylene wax, Fischer-Tropsch wax, oxidized Fischer-Tropsch wax, hydroxystearamide wax, functionalized wax, amorphous wax, microcrystalline wax, beeswax, vegetable wax, petroleum wax, paraffin wax, chemically modified hydrocarbon wax, substituted amide wax, a combination thereof, and a derivative of one or more of the foregoing waxes.

18. The adhesive of claim 1, further comprising at least 0.1 wt % of a block, an antiblock, a pigment, a dye, a dyestuff, a processing aid, a UV stabilizer, a lubricant, an adjuvant, a surfactant, a color masterbatch, a flow improver, a crystallization aid, a stabilizer, a defoamer, a preservative, a thickener, a rheology modifier, a humectant, water, or a combination thereof.

19. The adhesive of claim 1, comprising at least 0.1 wt % of one or more stabilizers selected from the group consisting of hindered phenols, sulfur phenols, phosphorous-containing phenols, 1,3,5-trimethyl-2,4,6-tris(3-5-di-tert-butyl-4-hydroxybenzyl)benzene, pentaerythritol tetrakis-3(3,5-di-tert-butyl-4-hydroxyphenyl)propionate, n-octadecyl-3(3,5-di-tert-butyl-4-hydroxyphenyl)propionate, 4,4'-methylenebis (4-methyl-6-tert butylphenol), 4,4'-thiobis(6-tert-butyl-o-cresol), 2,6-di-tert-butylphenol, 6-(4-hydroxyphenoxy)-2,4-bis(n-ocytlthio)-1,3,5-triazine, 2,4,6-tris(4-hydroxy-3,5-di-tert-butyl-phenoxy)-1,3,5-triazine, di-n-octadecyl-3,5-di-tert-butyl-4-hydroxybenzylphosphonate, 2-(n-octylthio) ethyl-3,5-di-tert-butyl-4-hydroxybenzoate, sorbitol hexa-(3, 3,5-di-tert-butyl-4-hydroxy-phenyl)propionate, and combinations or derivatives thereof.

20. The adhesive of claim 1, having a set time of 30 seconds or less.

21. The adhesive of claim 1, wherein the FPP comprises from 68 to 95 mole percent propylene and from 5 to 32 mole percent of a comonomer.

22. The adhesive of claim 1, wherein the adhesive has a T-peel adhesion at 20° C. to isotactic polypropylene of greater than about 595 N/m (3.4 lb/in), a T-peel adhesion at 20° C. to aluminum of greater than about 700 N/m (4.0 lb/in), and a T-peel adhesion at 20° C. to polyester of greater than about 192.5 N/m (1.1 lb/in).

23. A process to make the adhesive of claim 1 comprising combining an FRPP having at least 0.1 wt % of a functional group; a heat of fusion of between 0.5 and 70 J/g; and an mm triad tacticity index of at least 75%, with the amorphous polypropylene polymer grafted to isotactic polypropylene polymer, the tackifier, and the wax, to produce the adhesive, wherein the adhesive has a T-Peel adhesion on a polar substrate at 20° C. of at least 175 N/m (1 lb/in) and a T-Peel adhesion on a non-polar substrate at 20° C. of at least 175 N/m (1 lb/in).

* * * * *